US007949888B2

(12) United States Patent
Cox et al.

(10) Patent No.: US 7,949,888 B2
(45) Date of Patent: May 24, 2011

(54) FORCED IDLE OF A DATA PROCESSING SYSTEM

(75) Inventors: Keith Cox, Campbell, CA (US); David G. Conroy, El Granada, CA (US); Michael Culbert, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 650 days.

(21) Appl. No.: 11/970,476

(22) Filed: Jan. 7, 2008

(65) Prior Publication Data

US 2009/0177422 A1  Jul. 9, 2009

(51) Int. Cl.
G06F 1/00 (2006.01)
(52) U.S. Cl. ........................ 713/323; 323/234
(58) Field of Classification Search .......... 713/300–324; 323/234
See application file for complete search history.

(56) References Cited

U.S. PATENT DOCUMENTS

| | | |
|---|---|---|
| 5,167,024 A | 11/1992 | Smith et al. |
| 5,520,153 A | 5/1996 | Milunas |
| 5,532,935 A | 7/1996 | Ninomiya et al. |
| 5,627,412 A | 5/1997 | Beard |
| 5,812,860 A | 9/1998 | Horden |
| 5,825,674 A | 10/1998 | Jackson |
| 5,842,027 A | 11/1998 | Oprescu et al. |
| 5,915,838 A | 6/1999 | Stals et al. |
| 5,963,424 A | 10/1999 | Hileman et al. |
| 5,964,879 A | 10/1999 | Dunstan et al. |
| 6,122,758 A | 9/2000 | Johnson et al. |
| 6,134,667 A | 10/2000 | Suzuki et al. |
| 6,270,252 B1 | 8/2001 | Siefert |
| 6,415,388 B1 | 7/2002 | Browning et al. |
| 6,477,156 B1 | 11/2002 | Ala-Laurila et al. |
| 6,594,771 B1 | 7/2003 | Koerber et al. |
| 6,718,474 B1 | 4/2004 | Somers et al. |
| 6,745,117 B1 | 6/2004 | Thacher et al. |
| 6,888,332 B2 | 5/2005 | Matsushita |
| 6,925,573 B2 | 8/2005 | Bodas |
| 6,952,782 B2 | 10/2005 | Staiger |
| 6,986,069 B2 | 1/2006 | Oehler et al. |
| 7,036,027 B2 | 4/2006 | Kim et al. |
| 7,111,178 B2 | 9/2006 | Rusu et al. |
| 7,134,029 B2 | 11/2006 | Hepner et al. |
| 7,139,920 B2 | 11/2006 | Williams |
| 7,162,651 B2 | 1/2007 | Brockhaus |
| 7,171,570 B2 | 1/2007 | Cox et al. |

(Continued)

FOREIGN PATENT DOCUMENTS

EP  0632 360 A1  1/1995

(Continued)

OTHER PUBLICATIONS

PCT International Preliminary Report on Patentability Report on Patentability and Written Opinion for PCT Int'l. Application No. PCT/US2006/029244, mailed Mar. 6, 2008, (14 pages).

(Continued)

Primary Examiner — Clifford H Knoll
(74) Attorney, Agent, or Firm — Blakely, Sokoloff, Taylor & Zafman LLP

(57) ABSTRACT

Exemplary embodiments of methods and apparatuses to manage a power of a data processing system are described. A constraint parameter of a system operating at a first frequency and a first voltage is monitored. The system is, based on the monitoring of the constraint parameter, forced into an idle state while operating at a second frequency and a second voltage. The idle state prevents instructions from being executed.

25 Claims, 18 Drawing Sheets

U.S. PATENT DOCUMENTS

| | | |
|---|---|---|
| 7,177,728 B2 | 2/2007 | Gardner |
| 7,178,043 B2 | 2/2007 | Nakazato |
| 7,228,448 B2 | 6/2007 | Anderson et al. |
| 7,272,732 B2 | 9/2007 | Farkas et al. |
| 7,295,949 B2 | 11/2007 | Vorenkamp et al. |
| 7,421,598 B2 | 9/2008 | Brittain et al. |
| 7,451,332 B2 | 11/2008 | Culbert et al. |
| 2001/0021217 A1 | 9/2001 | Gunther et al. |
| 2002/0007463 A1 | 1/2002 | Fung |
| 2002/0020755 A1 | 2/2002 | Matsushita |
| 2002/0065049 A1 | 5/2002 | Chauvel et al. |
| 2002/0083354 A1 | 6/2002 | Adachi |
| 2002/0099962 A1 | 7/2002 | Nakamura |
| 2002/0143488 A1 | 10/2002 | Cooper et al. |
| 2002/0194509 A1 | 12/2002 | Plante et al. |
| 2003/0053293 A1 | 3/2003 | Beitelmal et al. |
| 2003/0126475 A1 | 7/2003 | Bodas |
| 2003/0188210 A1 | 10/2003 | Nakazato |
| 2004/0003301 A1 | 1/2004 | Nguyen |
| 2004/0003303 A1 | 1/2004 | Oehler et al. |
| 2004/0044914 A1 | 3/2004 | Gedeon |
| 2004/0064745 A1 | 4/2004 | Kadambi |
| 2004/0088590 A1 | 5/2004 | Lee et al. |
| 2004/0117680 A1 | 6/2004 | Naffziger |
| 2004/0133816 A1 | 7/2004 | Miyairi |
| 2004/0148528 A1 | 7/2004 | Silvester |
| 2004/0159240 A1 | 8/2004 | Lyall |
| 2004/0163001 A1 | 8/2004 | Bodas |
| 2004/0181698 A1 | 9/2004 | Williams |
| 2004/0210787 A1 | 10/2004 | Cox et al. |
| 2005/0015764 A1 | 1/2005 | Gaur |
| 2005/0055590 A1 | 3/2005 | Farkas et al. |
| 2005/0102539 A1 | 5/2005 | Hepner et al. |
| 2005/0132371 A1 | 6/2005 | Lopez-Estrada |
| 2005/0136989 A1 | 6/2005 | Dove |
| 2005/0138440 A1 | 6/2005 | Barr et al. |
| 2005/0143865 A1 | 6/2005 | Gardner |
| 2005/0149540 A1 | 7/2005 | Chan et al. |
| 2005/0182986 A1 | 8/2005 | Anderson et al. |
| 2005/0210304 A1 | 9/2005 | Hartung et al. |
| 2005/0240786 A1 | 10/2005 | Ranganathan |
| 2005/0278556 A1 | 12/2005 | Smith et al. |
| 2006/0005057 A1 | 1/2006 | Nalawadi et al. |
| 2006/0036878 A1 | 2/2006 | Rothman et al. |
| 2006/0047983 A1 | 3/2006 | Aleyraz et al. |
| 2006/0168456 A1 | 7/2006 | Chaudhry et al. |
| 2006/0190745 A1 | 8/2006 | Matsushima et al. |
| 2006/0190749 A1 | 8/2006 | He et al. |
| 2006/0248354 A1 | 11/2006 | Pineda De Gyvez et al. |
| 2006/0288241 A1 | 12/2006 | Felter et al. |
| 2006/0294400 A1 | 12/2006 | Diefenbaugh et al. |
| 2007/0016706 A1 | 1/2007 | Arnold et al. |
| 2007/0083779 A1 | 4/2007 | Misaka et al. |
| 2008/0276111 A1 | 11/2008 | Jacoby et al. |
| 2010/0040085 A1 | 2/2010 | Olderdissen et al. |

FOREIGN PATENT DOCUMENTS

| | | |
|---|---|---|
| GB | 2405236 A | 2/2005 |
| WO | WO 03/060678 A2 | 7/2003 |
| WO | WO 2007/024403 A2 | 3/2007 |

OTHER PUBLICATIONS

PCT International Search Report and Written Opinion for PCT Int'l. Application No. PCT/US2006/029244, mailed Sep. 17, 2007, (22 pages).

PCT International Search Report and Written Opinion for PCT Int'l. Application No. PCT/US2008/013975 mailed Mar. 17, 2009, (13 pages).

PCT International Search Report and Written Opinion for PCT Int'l. Application No. US2006/029049, mailed Nov. 29, 2006, (14 pages).

PCT Preliminary Report on Patentability and Written Opinion for PCT Int'l. Application No. PCT/US2006/029049, mailed Mar. 6, 2008, (10 pages).

PCT International Search Report and Written Opinion for PCT Int'l. Application No. US2008/014036, mailed Jul. 22, 2010, (14 pages).

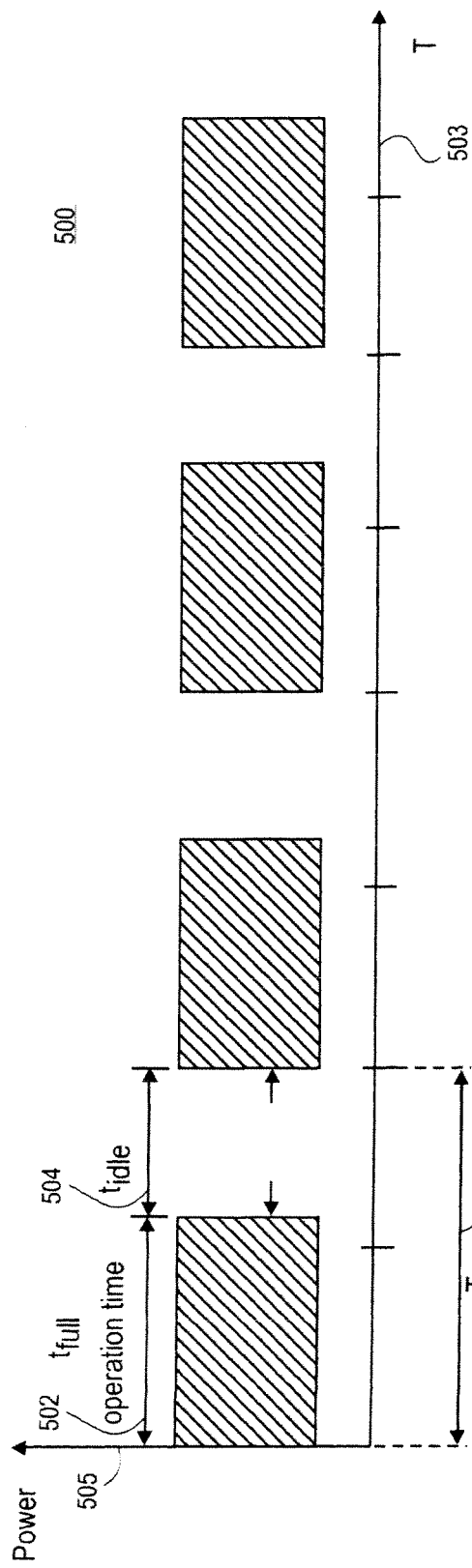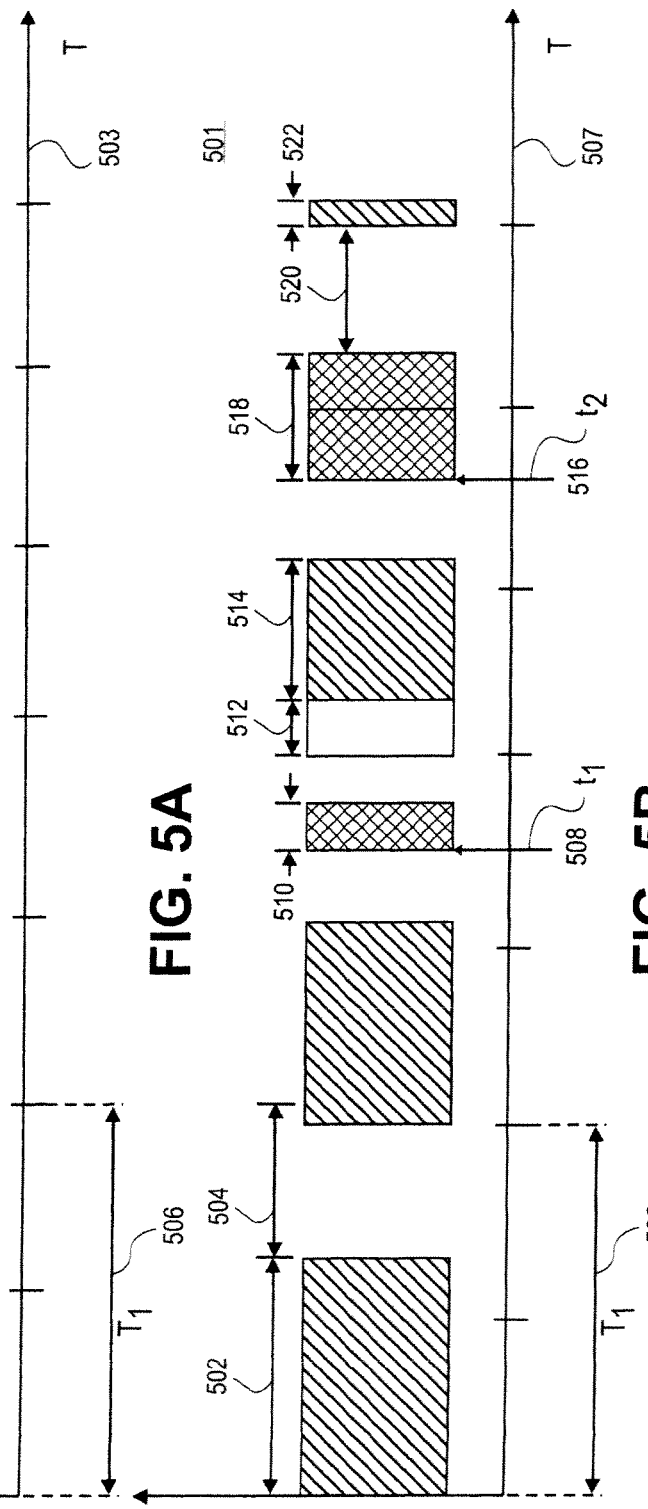
FIG. 5A
FIG. 5B

TABLE I

| idle ratio (601) | idle rate (603) | idle time (605) |
|---|---|---|
| 0 | 30000 microseconds | 0 microseconds |
| 5 | 30000 microseconds | 1500 microseconds |
| 10 | 30000 microseconds | 3000 microseconds |
| 15 | 30000 microseconds | 4500 microseconds |
| 20 | 30000 microseconds | 6000 microseconds |
| 25 | 30000 microseconds | 7500 microseconds |
| 30 | 30000 microseconds | 9000 microseconds |
| 35 | 28571 microseconds | 10000 microseconds |
| 40 | 25000 microseconds | 10000 microseconds |
| 45 | 22222 microseconds | 10000 microseconds |
| 50 | 20000 microseconds | 10000 microseconds |
| 55 | 18181 microseconds | 10000 microseconds |
| 60 | 16666 microseconds | 10000 microseconds |
| 65 | 15384 microseconds | 10000 microseconds |

FIG. 6

FORCED IDLE OF A DATA PROCESSING SYSTEM

RELATED APPLICATIONS

The present application is related to U.S. patent application Ser. No. 11/970,483 entitled "Forced Idle of a Data Processing System" of Keith Cox, David Conroy, Michael Culbert, and Guy Sotomayor filed Jan. 7, 2008.

FIELD

At least some embodiments of the present invention relate generally to data processing systems, and more particularly but not exclusively to the management of power in data processing systems.

BACKGROUND

Traditionally, computer systems are designed to be able to continuously run a fairly worst-case power load. Design according to such a continuous worst-case power load has never been much of a problem, because traditionally the individual components have had modest operating powers and the computer systems have had large power budgets so that the systems could sustain the load fairly naturally.

As the operating power consumptions of the individual components of computer system creep upwards, the power budgets of the computer systems have become tighter. It is now becoming a challenge to design a computer system to run a continuous worst-case workload while pursuing other high performance goals, such as high computing power, compactness, quietness, better battery performance, etc. For example, portable computer systems, such as laptop computers, have a limited battery output capability; and thus a worst-case workload for a given battery output capability may limit the performance of the system because the worst case workload may rarely occur.

Therefore, managing power is important to achieve both battery life and thermal design goals of the computer system. One common technique, for example, for managing the power of the central processing unit ("CPU") is to dynamically adjust both the frequency of operation and the power supply voltage of the CPU core between multiple distinct states of the computer system. Typically, at a power operating point of the computer system there may be two components to power consumption, such as dynamic power and leakage power. Dynamic power represents the actual desired circuit operation. It may be proportional to the number of clock transitions per second (frequency) and the square of the voltage. Leakage power represents the cost overhead of having the CPU powered at all. It is fixed for a given voltage, and normally rises exponentially with increasing voltage. Dynamically adjusting the frequency of operation, however, only manages the dynamic power and has no effect on the leakage power of the computer system.

SUMMARY OF THE DESCRIPTION

Exemplary embodiments of methods and apparatuses to manage power of a data processing system are described. One or more constraint parameters of the data processing system may be monitored. The data processing system may operate at a first frequency and a first voltage while the one or more constraint parameters are being monitored. The data processing system is forced into an idle state, while operating at a second frequency and a second voltage, based on the one or more constraint parameters. In one embodiment, the idle state prevents instructions from being executed and the second frequency is greater than zero and less than the first frequency, and the second voltage is greater than zero and less than the first voltage. In other embodiments, the idle state prevents instructions from being executed and the second frequency is zero and the second voltage is, for at least portions of the system, also zero. In one embodiment, a rate of forcing the system into the idle state is determined based on the constraint parameter. The constraint parameter may be, for example, power, temperature, current, battery load, or any combination thereof.

In one embodiment, a constraint parameter of a system operating at a first voltage and a first frequency is monitored. The system may be forced into the idle state if the first voltage is the minimum voltage and the constraint parameter is greater than a constraint parameter threshold. An operating point of the system may be decreased if the system does not operate at the minimum voltage and the constraint parameter is greater than the constraint parameter threshold. The operating point of the system may be decreased by decreasing an operating voltage of the system, operating frequency of the system, or any combination thereof. In one embodiment, a percentage of the idle state for the system operating at the first frequency and the first voltage is determined based on the constraint parameter.

At least in some embodiments, a data processing system may comprise a processor, a memory coupled to the processor, one or more sensors coupled to the processor to monitor a constraint parameter of the system operating at a first frequency and a first voltage. The processor may be configured, based on the constraint parameter, to force the system into an idle state, in which no instructions are executed by the processor, while the system operates at a second frequency and a second voltage which is lower than the first voltage. The memory may store information about when and how to force the system into the idle state. In one embodiment, the processor may be further configured to determine a rate of forcing the system into the idle state. In one embodiment, the processor may be further configured to force the system into the idle state if the first voltage is the minimum voltage and the constraint parameter is greater than a constraint parameter threshold. In one embodiment, the processor may be further configured to decrease an operating point of the system if the system does not operate at the minimum voltage and the constraint parameter is greater than the constraint parameter threshold.

In one embodiment, the processor is further configured to determine a percentage of the idle state for the system operating at the first frequency and the first voltage based on the constraint parameter.

At least in some embodiments, a machine-readable medium is described that contains executable program instructions which cause a data processing system to perform operations comprising monitoring a constraint parameter of the system operating at a first frequency and a first voltage; forcing the system, based on the monitoring of the constraint parameter, into an idle state while the system operates at a second frequency and a second voltage which is less than the first voltage.

In one embodiment, the machine-readable medium further includes instructions that cause the data processing system to determine a rate of forcing the system into the idle state. In one embodiment, the machine-readable medium further includes instructions that cause the data processing system to force the system into the idle state if the first voltage is the minimum voltage and the constraint parameter is greater than the constraint parameter threshold.

In one embodiment, the machine-readable medium further includes instructions that cause the data processing system to decrease an operating point of the system (e.g., voltage, frequency, or any combination thereof) if the system does not operate at the minimum voltage and the constraint parameter is greater than the constraint parameter threshold.

In one embodiment, the machine-readable medium further includes instructions that cause the data processing system to determine a percentage of the idle state for the system operating at the first frequency and the first voltage based on the constraint parameter.

At least in some embodiments, a data processing system is described that comprises means for monitoring a constraint parameter of the system operating at a first frequency and a first voltage; and means for forcing the system, based on the monitoring of the constraint parameter, into an idle state while the system operates at a second frequency and a second voltage which is less than the first voltage. In one embodiment, the data processing system further comprises means for forcing the system into the idle state if the first voltage is the minimum voltage and the constraint parameter is greater than the constraint parameter threshold. In one embodiment, the data processing system further comprises means for determining a percentage of the idle state for the system operating at the first frequency and the first voltage based on the constraint parameter.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 5A is a diagram illustrating forcing a data processing system into an idle state while the system continues to operate according to one embodiment of the invention.

FIG. 5B is a diagram illustrating forcing a data processing system into an idle state while the system continues to operate according to another embodiment of the invention.

FIG. 6 shows one embodiment of a table that includes information about the idle state.

DETAILED DESCRIPTION

Figure 1A:
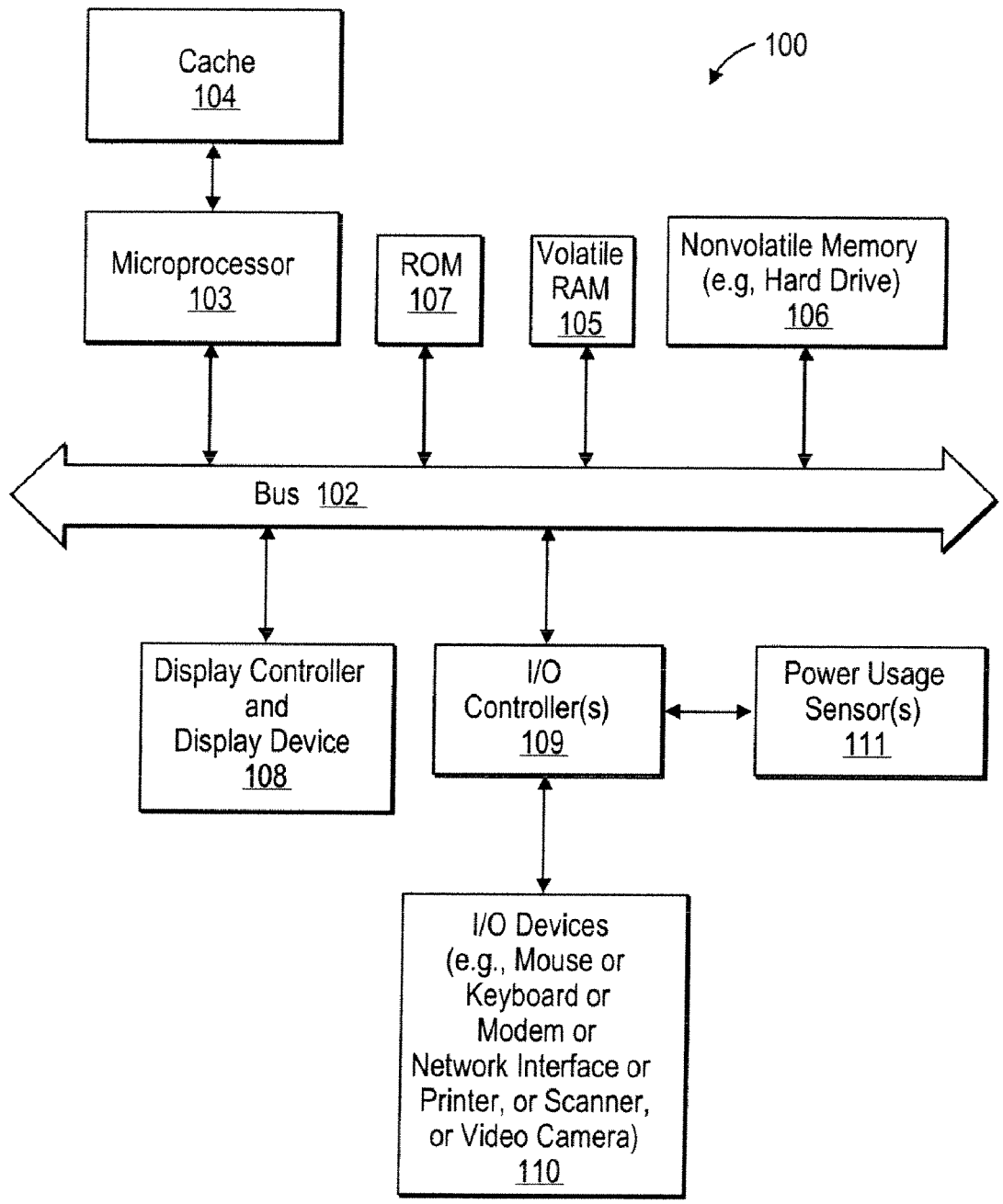
FIG. 1A shows one example of a typical computer system which may be used to provide a forced idle state.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g., computer) readable storage medium, such as, but is not limited to, any type of disk, including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of media.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below.

In addition, embodiments of the present invention are not described with reference to any particular programming language. It will be appreciated that a variety of programming languages may be used to implement the teachings of embodiments of the invention as described herein.

Many of the methods of the present invention may be performed with a digital processing system, such as a conventional, general-purpose computer system. The computer systems may be, for example, entry-level Mac mini™ and consumer-level iMac™ desktop models, the workstation-level Mac Pro™ tower, and the MacBook™ and MacBook Pro™ laptop computers produced by Apple Inc., located in Cupertino, Calif. Small systems (e.g. very thin laptop computers) can benefit from the methods described herein. Special purpose computers, which are designed or programmed to perform only one function, or consumer electronic devices, such as a cellular telephone, may also perform the methods described herein.

FIG. 1A shows one example of a typical computer system which may be used to provide a forced idle state. Note that while FIG. 1A illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1A may, for example, be an Apple Macintosh® computer.

As shown in FIG. 1A, the computer system 100, which is a form of a data processing system, includes a bus 102 which is coupled to a microprocessor 103 and a ROM 107 and volatile RAM 105 and a non-volatile memory 106. The microprocessor 103, which may be, for example, a G3, G4, or G5 microprocessor from Motorola, Inc. or IBM or a microprocessor from Intel is coupled to cache memory 104 as shown in the example of FIG. 1A. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1A shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

In one embodiment of the present invention, at least some of the components can be actively throttled to trade performance for power usage. For example, the microprocessor 103 may have different core voltage and frequency settings. In one embodiment, system 100 includes throttled component(s) and non-throttled component(s). A throttled component has different throttle settings at which the component is functional but at different power/performance levels (operating setting). For example, a processor may be throttled to work at different core voltages and core frequencies; a disk drive may be throttled to work at different spin rate; a bus may be throttled at different frequencies; etc. If a component is not throttled to trade performance for power usage, the component is considered a non-throttled component. Throttled and non-throttled components of the data processing system are described in further detail in U.S. patent application Ser. No. 11/212,970, filed Aug. 25, 2005, which is hereby incorporated herein by reference in its entirety.

In one embodiment of the present invention, the system 100 further includes power usage sensor(s) 111 that are coupled to the I/O controller(s) 109. Sensor(s) 111 may include one or more hardware and/or software components. In one embodiment, the sensors are implemented using hardware. Alternatively, at least some of the sensors can be implemented using software. For example, software modules may be used to determine the operation states and corresponding time periods to compute the actual power usage from predetermined power consumption rate for the operation states, as described in further detail in U.S. patent application Ser. No. 11/212,970, filed Aug. 25, 2005; U.S. patent application Ser. No. 11/327,685 filed Jan. 5, 2006; U.S. patent application Ser. No. 11/327,275, filed Jan. 5, 2006; and U.S. patent application Ser. No. 11/327,238, filed Jan. 5, 2006, which are hereby incorporated herein by reference in their entirety.

One or more sensors may be used to monitor one or more constraint parameters of the system 100, as described in further detail below. The constraint parameters may be, for example, power, temperature, current, load of a battery (not shown) that may be coupled to the system 100, or any combination thereof. The one or more constraint parameters of the system may be monitored to determine the power usage of the Central Processing Unit (CPU) (e.g., microprocessor 103) and/or the Graphical Processing Unit (GPU) (e.g., a processor of the display controller 108). Further, one or more sensor may be directly coupled to the CPU and/or GPU (not shown).

In one embodiment, actual power usages are monitored by sensor(s) 111. For example, the actual power usage can be measured periodically to determine the history of the power usage. The history of the power usage can be used to determine the power usage in certain averaged ways. In one embodiment, with the knowledge of the past power usage the system can dynamically determine the allowable power budget for the next time interval, as described in further detail in U.S. patent application Ser. No. 11/212,970, filed Aug. 25, 2005, which is hereby incorporated herein by reference in its entirety.

In one embodiment of the present invention, the microprocessor 103 dynamically budgets power usage and forces system 100 into an idle state, as described in further detail below, according to instruction stored in cache 104, ROM 107, RAM 105, and/or nonvolatile memory 106. Alternatively, the system 100 further includes a microcontroller (not shown) to dynamically budget power usage and determine when and how to force the system to enter the forced idle state based on the information stored in cache 104, ROM 107, RAM 105, nonvolatile memory 106, or any combination thereof, as described in further detail below. In one embodiment, the data processing system 100 may include multiple central processing unit (CPU)/microprocessors.

It will be apparent from this description that aspects of the present invention may be embodied, at least in part, in software. That is, the techniques may be carried out in a computer system or other data processing system in response to its processor, such as a microprocessor or a microcontroller, executing sequences of instructions contained in a memory, such as ROM 107, volatile RAM 105, non-volatile memory 106, cache 104, or other storage devices, or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103, or a microcontroller.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1A. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; and the like.

The methods of the present invention can be implemented using dedicated hardware (e.g., using Field Programmable Gate Arrays, or Application Specific Integrated Circuit) or shared circuitry (e.g., microprocessors or microcontrollers under control of program instructions stored in a machine readable medium. The methods of the present invention can also be implemented as computer instructions for execution on a data processing system, such as system 100 of FIG. 1A.

Figure 1B:
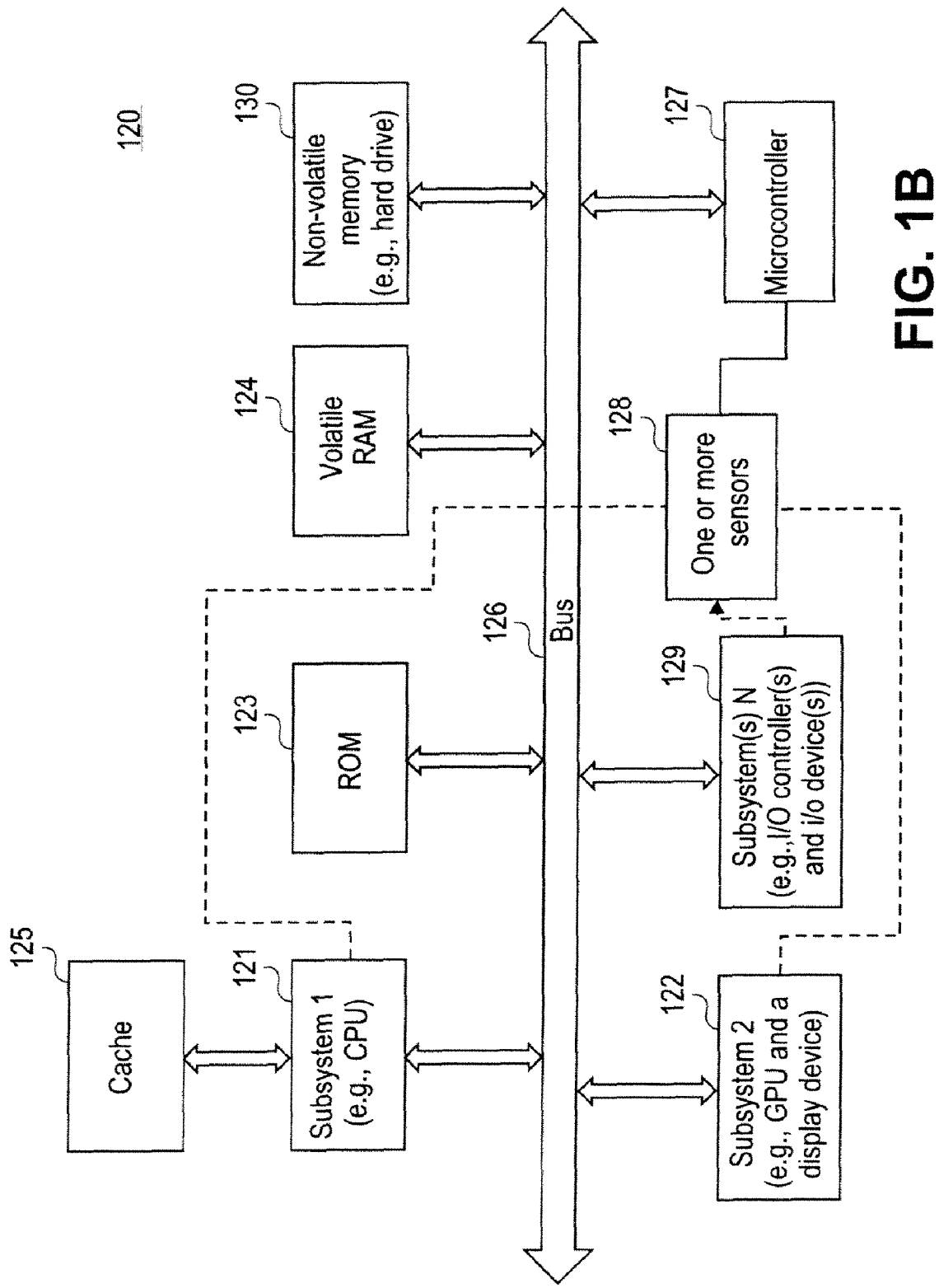
FIG. 1B illustrates another embodiment of a system to provide a forced idle state.

FIG. 1B illustrates another embodiment of a system 120 to provide a forced idle state. The system 120 has a plurality of subsystems. In one embodiment, the plurality of subsystems includes processors, e.g., a CPU, a GPU, a microcontroller, and the like. As shown in FIG. 1B system 120 includes a subsystem 121, e.g., a CPU, a subsystem 122, e.g., a GPU that may be coupled with a display device, and one or more subsystems 129, e.g., one or more I/O controllers coupled to one or more I/O devices, and a microcontroller 127 coupled to a bus 126. Further, system 120 includes a volatile RAM 124, a non-volatile memory 130, e.g., a hard drive, ROM 123, and a cache memory 125 coupled to subsystem 121 which is coupled to bus 126.

The power used by at least a subset of each of the subsystems is controlled, e.g., by a microcontroller, such as microcontroller 127, and a maximum power used by each of the subsystems is determined by the dynamic power history of the whole system over an averaging period, as described in further detail in U.S. patent application Ser. No. 11/212,970, filed Aug. 25, 2005, which is hereby incorporated herein by reference in its entirety. Such control of power allows higher performance operation in at least certain environments. That is, the subsystems may operate at bursts of substantially high power if there is a considerable low power operation, e.g., an idle time, during the averaging period, as described in further detail in U.S. patent application Ser. No. 11/212,970, filed Aug. 25, 2005, which is hereby incorporated herein by reference in its entirety.

In one embodiment, the power of the system is redistributed among the subsystems based on the load profile, as described in further detail in U.S. patent application Ser. No. 11/327,685 filed Jan. 5. 2006; U.S. patent application Ser. No. 11/327,275, filed Jan. 5, 2006; and U.S. patent application Ser. No. 11/327,238, filed Jan. 5, 2006, which are hereby incorporated herein by reference in their entirety.

One or more sensors 128 are coupled to subsystems 121, 122, 129, and to microcontroller 127, as shown in FIG. 1B. The sensors may be used to monitor, measure and/or estimate one or more constraint parameters, such as power, temperature, current, battery load, or any combination thereof, to determine actual power usage by one or more of the subsystems operating at a certain frequency and a certain voltage. The sensors 128 in turn may provide the determined power usage values to the microcontroller 127 that may force the system and/or the subsystem into an idle state based on the one or more sensed parameters as described in further detail below. Components of the system 120, including processors, microcontrollers, buses, I/O controllers, I/O devices, memories, sensors are described in detail above with respect to FIG. 1A. In one embodiment, one or more look up tables that include information about when and how to force the system and/or subsystem into the idle state, as described in further detail below, are stored in any of memories 126, 124, and 125 or within a memory in the microcontroller 127. In one embodiment, microcontroller 127 performs methods described below with respect to FIGS. 4-19. In another embodiment, subsystem 121, rather than microcontroller 127, performs methods described below with respect to FIGS. 4-19. In yet another embodiment, subsystem 121 and the microcontroller 127 together perform the methods described below with respect to FIGS. 4-19.

Figure 2:
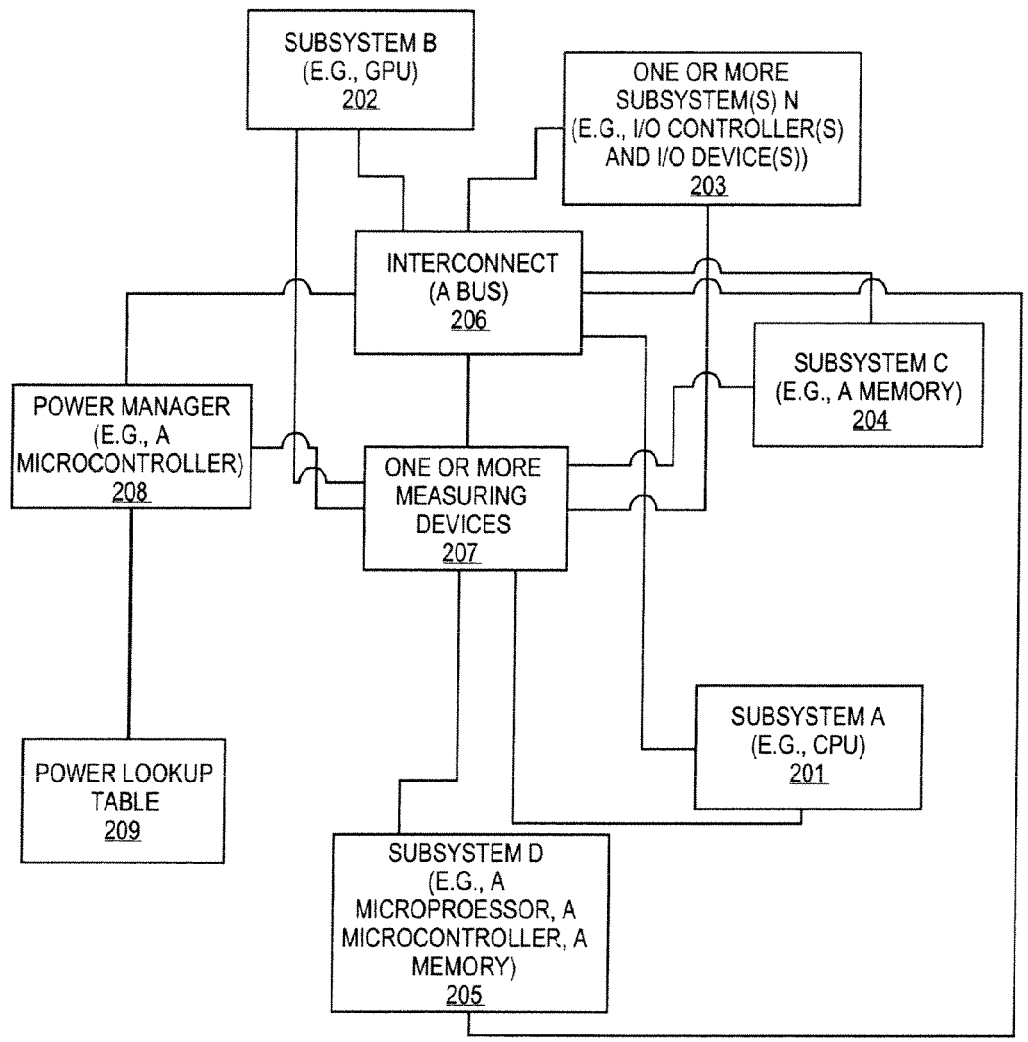
FIG. 2 illustrates one embodiment of a system that provides a forced idle state.

FIG. 2 illustrates one embodiment of a system that provides a forced idle state. As shown in FIG. 2 system 200 includes a subsystem A 201, e.g., a CPU, a subsystem B 202, e.g., a GPU that may be coupled with a display device, subsystem C 204, e.g., a memory, subsystem D 205, e.g., a microprocessor, and one or more subsystems N 203, e.g., one or more I/O controllers coupled to one or more I/O devices, a power manager 208, e.g., a microcontroller, a system management controller ("SMC"), coupled to a interconnect 206, e.g., a bus. Subsystem C 204 may be a volatile RAM, a non-volatile memory, e.g., a hard drive, and/or a ROM. One or more measuring devices 207, e.g., one or more sensors, as described above with respect to FIGS. 1A and 1B, are coupled to subsystems 201-205, and to power manager 208, as shown in FIG. 2. A power look-up table 209 that may include one or more look up tables that contain information about how and when to enter the forced idle state, as described below with respect to FIGS. 4-19, is coupled to power manager 208, as shown in FIG. 2. Components of the system 200, including processors, microcontrollers, buses, I/O controllers, I/O devices, memories, sensors are described in detail above with respect to FIGS. 1A and 1B. In one embodiment, one or more power lookup tables corresponding to various performance settings of the computer system may be generated by subsystem 201 (or generated by test equipment in the design and/or manufacturing process), and stored in memory 204, and/or in a memory located in power manager 208. One or more power look up tables that include various performance settings of the computer system may be used as described in further detail in U.S. patent application Ser. No. 11/212,970, filed Aug. 25, 2005; U.S. patent application Ser. No. 11/327,685 filed Jan. 5, 2006; U.S. patent application Ser. No. 11/327,275, filed Jan. 5, 2006; and U.S. patent application Ser. No. 11/327,238, filed Jan. 5, 2006, which are hereby incorporated herein by reference in their entirety. In one embodiment, power manager 208 performs methods described below with respect to FIGS. 4-19. In another embodiment, subsystem 201 performs methods described below with respect to FIGS. 4-19.

Figures 3A, 3B:
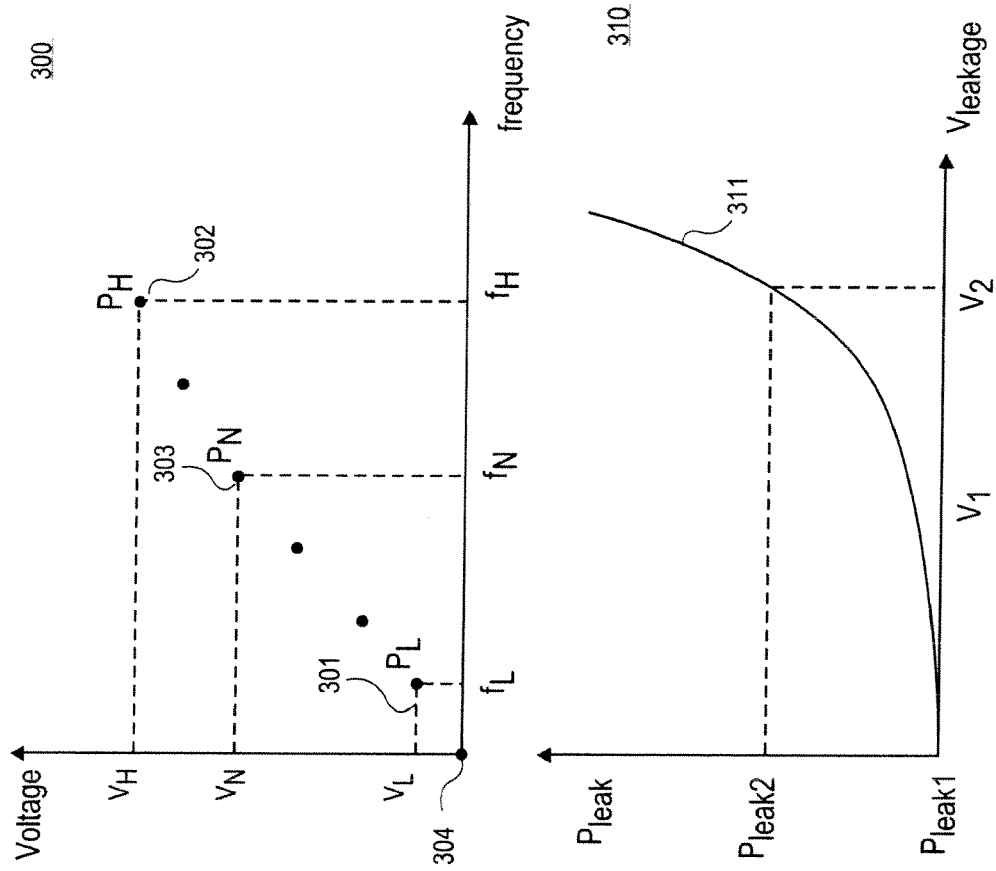
FIG. 3A is a diagram that illustrates one embodiment of power operating points of a data processing system.
FIG. 3B is a diagram illustrating dependence of a leakage power on a power supply voltage.

FIG. 3A is a diagram that illustrates one embodiment of power operating points of a data processing system. For example, the data processing system may be any of the data processing systems as depicted in FIGS. 1A, 1B, and 2. As shown in FIG. 3A, a power operating point of the data processing system, such as power operating points 301-304, corresponds to a pair of operating frequency and voltage of the data processing system. The operating frequency and voltages may be, for example, core voltages and frequencies of a microprocessor of the data processing system. As shown in FIG. 3A, the highest power operating point, such as an operating point $P_H$ (302) represents the highest power consumed by the data processing system. The highest power consumed by the data processing system may be determined based on one or more system constraint parameters, such as power, temperature, current, battery load, and the like. The highest power operating point $P_H$ (302) may correspond to a pair of highest operating frequency ($f_H$) and voltage ($V_H$). As shown in FIG. 3A, the intermediate power operating points, such as an operating point $P_N$ (303) represents the intermediate power consumed by the data processing system. The intermediate power operating point $P_N$ (303) corresponds to a pair of intermediate operating frequency ($f_N$) and voltage ($V_N$). Typically, the operating frequency of a data processing system may be reduced if the power of a data processing system needs to be reduced to a power state which is below the one defined by the minimum (lowest) operating voltage $V_L$. The operating frequency ($f_N$) of the data processing system may be reduced by a ratio X, where X is less than 1. For an example, if the operating frequency ($f_N$) of a circuit at its lowest voltage is 1 GHz, a reduction by X=20% changes the operating frequency to 800 MHz (first case). This has the net effect of reducing the dynamic power by 20%, but has no effect on the leakage power.

The minimum power efficient operating point of the data processing system is determined by the lowest voltage and the highest frequency at which the data processing system continues to behave as designed when operated at the lowest voltage. This minimum power efficient operating point, such as operating point $P_L$ (301) that corresponds to the lowest (minimum) operating voltage ($V_L$) and the corresponding highest (maximum) operating frequency ($F_L$) is typically referred as Low Frequency Mode ("LFM"). Typically, the lowest operating voltage $V_L$ is not more than several hundred millivolts. Typically, the data processing system may reduce manageable power only to the minimum power operating point, such as $P_L$ (301), because the data processing system has no practical operating points below this point; since the data processing system is already at the minimum voltage, its only alternative is to lower the operating frequency, which is less efficient and may not even be functional.

Typically, in order to save power when a data processing system has no tasks to perform, the data processing system stops the clock entirely (zero frequency). This has the effect of reducing dynamic power to zero. In addition to stopping the clock, the data processing system may move to a reduced voltage level. This has the effect of exponentially reducing leakage power, shown in FIG. 3B, which illustrates the relationship between leakage power (Pleak) and the power supply voltage. This operating point is typically referred to as the idle state.

Figure 18:
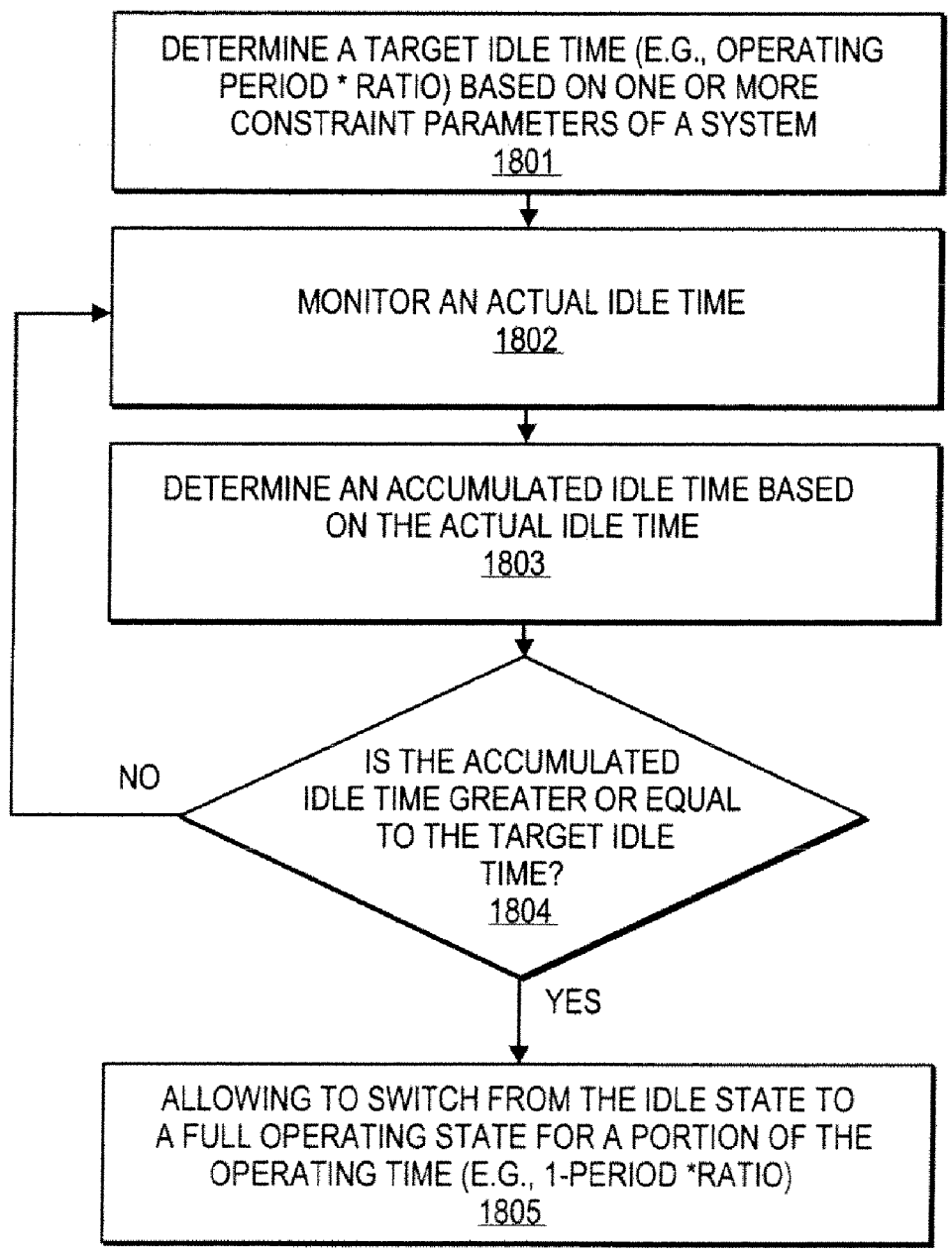
FIG. 18 is a flow chart of one embodiment a method to switch from a forced idle state.
Figure 19:
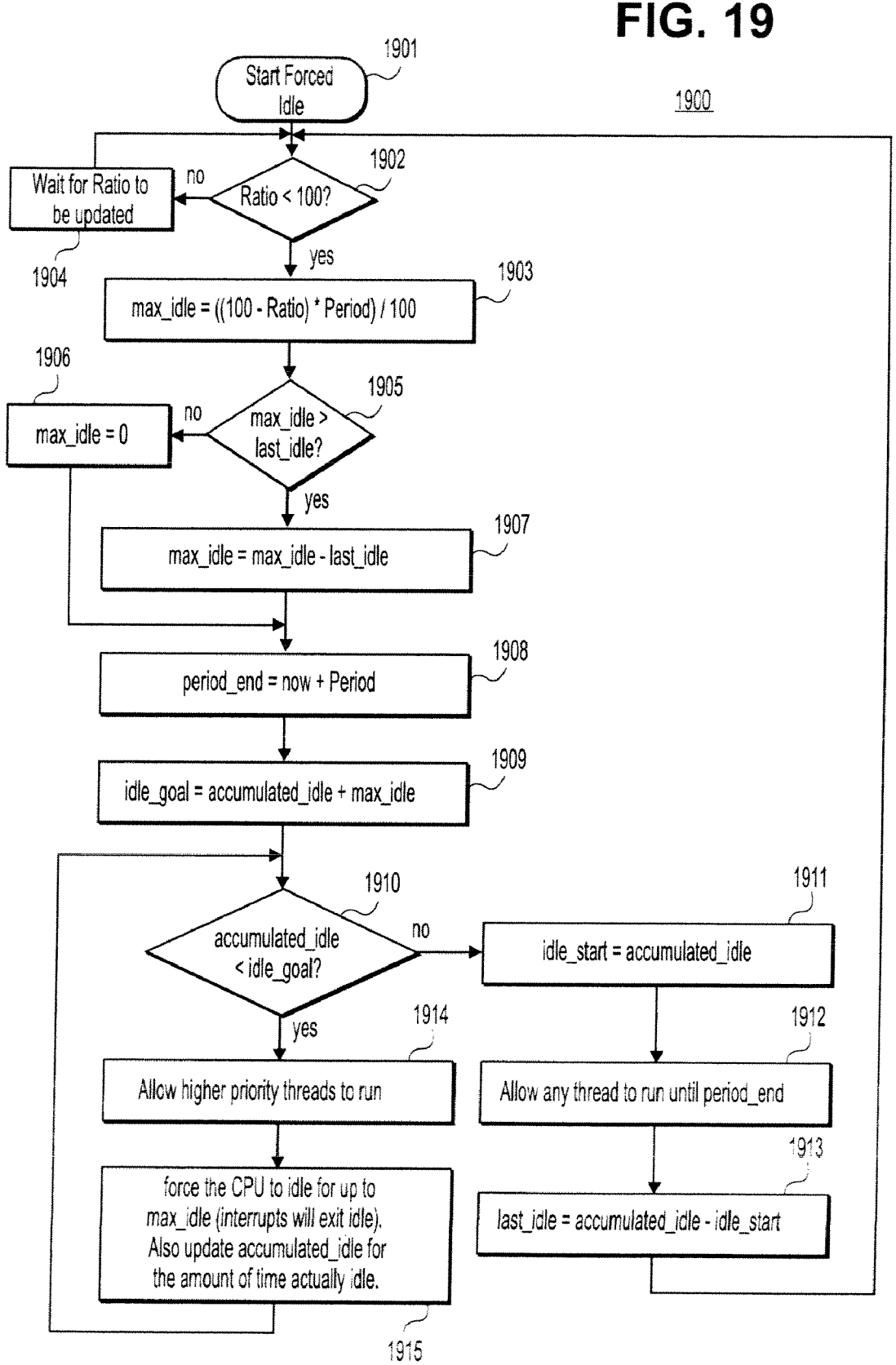
FIG. 19 is a flow chart of one embodiment a method to provide a forced idle state.

At least certain embodiments described herein allow a system to operate below a minimum power operating point (such as $P_L$ 301) by using intelligently decided forced idling, which forces an idle state (even if there are tasks to perform, such as software instructions waiting to be executed) based upon, at least in certain embodiments, a comparison between an actual idle time and a target idle time as shown in FIGS. 18 and 19 which is described further below; this forced idling is intelligent because there can be times when the comparison shows that an idle state should not be forced (for example, when there has already been sufficient idle time).

In one embodiment, additional operating points below the minimum power operating point are created by continuing operation of the data processing system at the minimum power operating point, and by forcing the data processing system into an idle state for a certain percentage (e.g., 20%) of the operating time (e.g., a period of a clock). The effective power of a minimum operating point with a 20% forced idle (20% of the time the system is forced to idle) is 0.8 times the power of the minimum operating point plus 0.2 times the power of the idle state. Since the power of the idle state is very low, this new operating point with an intelligently decided forced idling represents a point whose power is less than the minimum operating point.

In one embodiment, a forced idle state is provided at any power operating point of a data processing system. For example, the forced idle state may be provided at any of the power operating points 301, 302, and 303, and these forced idle states create intermediate points which may be useful in certain embodiments.

There are many important considerations in implementing a forced idle scheme. Some software tasks (e.g., multi-media playback) require a real-time response and cannot afford to be delayed. Many hardware devices require their software driver to respond to them within a fixed latency, or incorrect operation may result. Some software threads, e.g., real time tasks, interrupts, cannot be subject to the forced idling. A proper implementation of forced idle needs to take such issues into consideration (although it is not a requirement depending upon the needs of the system being implemented). In one embodiment, the operating system (OS) kernel keeps track, for example, of which threads can be held off, and which require immediate operation independent of the forced idle setting. This kernel is responsible for guaranteeing that the long term average forced idle percentage is maintained in the presence of real-time threads. In one embodiment, the scheduler in kernel performs the forced idling on all processes/threads run on the data processing system. In one embodiment, the operating system ("OS") scheduler mechanisms are used to provide forced idling.

Figure 4:
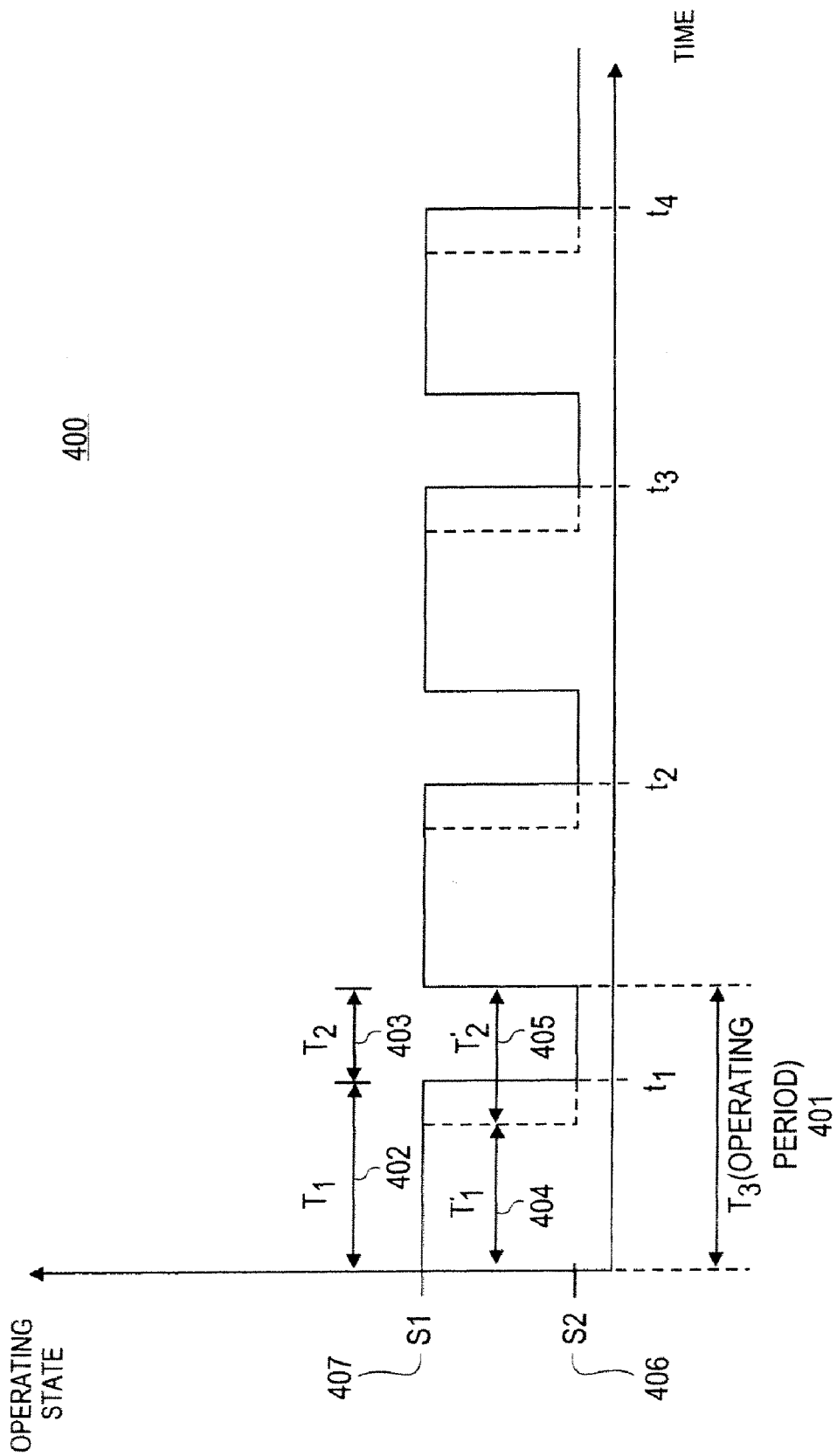
FIG. 4 is a diagram illustrating forcing a data processing system into an idle state while the system continues to operate according to one embodiment of the invention.

FIG. 4 is a diagram illustrating forcing a data processing system into an idle state while the system continues to operate according to one embodiment of the invention. As shown in FIG. 4, the data processing system is forced to enter an idle state $S_2$ (406) at a first portion, such as portion $T_2$ (403) of the operating time, such as time $T_3$ (401), while continuing to operate in full (e.g., 100%) operating state $S_1$ (407) at a second portion, such as portion $T_1$ (402) of the operating time, such as time $T_3$ (401). In one embodiment, the data processing system continues to operate in state $S_1$ (407) at any operating frequency that is allowed for a corresponding operating voltage. In one embodiment, the data processing system is forced to enter the idle state while continuing to operate in operating state $S_1$ (407) at a maximum frequency allowed at the lowest voltage. As shown in FIG. 4, the data processing system is forced to enter the idle state at times $t_1$, $t_2$, $t_3$, and $t_4$.

FIG. 5A is a diagram illustrating forcing a data processing system into an idle state while the system continues to operate according to one embodiment of the invention. As shown in FIG. 5A, the system is forced into an idle state for one portion of a time, such as portion 504 of time $T_1$ (506) while continuing to operate for another portion of the time, such as portion 502 of time $T_1$ at a certain operating frequency and voltage based on the one or more constraint parameters. In one embodiment, time $T_1$ is a clock period (e.g., T~1/f) of the data processing system. In one embodiment, the idle state prevents the system to execute instructions. In one embodiment, the clock is stopped (operating frequency is zero) when the system is in the idle state. As shown in FIG. 5A, the rate of modulation to force the system in the idle state is maintained constant, such that the portion of the time the system spends in the idle state and the portion of the time the system spends in the full operating state is kept the substantially the same.

FIG. 5B is a diagram illustrating forcing a data processing system into an idle state while the system continues to operate according to another embodiment of the invention. As shown in FIG. 5B, an interrupt 1 (508) is received at time $t_1$ while the system is in the forced idle state. The system is switched back to operate in a full (e.g., 100%) operating state at a certain frequency and voltage in response to the interrupt 1, as shown in FIG. 5B. In one embodiment, switching from the idle state to the full operating state in response to the interrupt is performed based on an actual idle time and the target idle time, as described in further detail below. After serving the interrupt 1, the system is switched back to the forced idle state. The system may remain in the forced idle state for idle time 512, as shown in FIG. 5B. In one embodiment, idle time 512 may be determined based on the system constraint parameters and on how much time the system spent in the full operating state serving the interrupt 1 (time 510). As shown in FIG. 5B, an interrupt 2 is received at time $t_2$ while the system is in the idle state. The system is switched back to operate in a full (e.g., 100%) operating state in response to the interrupt 2. The system may remain in the full operating state for time 518, as shown in FIG. 5B. In one embodiment, time 518 is determined based on the system constraint parameters and on the amount of accumulated idle time. In one embodiment, the accumulated idle time is determined over one or more clock periods of the data processing system. As shown in FIG. 5B, after serving the interrupt, the system is forced back to the idle state for time 520 and then switched to the full operating state to operate during time 522 that can be determined by the system constraint parameters and accumulated idle time, as described below. That is, the system is allowed to serve interrupt to operate high priority tasks any time during the forced idle state based on the thermal/power constraints that is very important to the responsiveness of the system.

Another important consideration is rate of modulation of forced idle and the maximum time that the data processing system may spend in the continuous forced idle state. If the rate of modulation for enabling and disabling execution of the instructions (e.g., to perform computation) is too fast, significant power and computational energy will be spent managing the overhead of the forced idle loop. If the rate of modulation for enabling and disabling execution of the instructions is too slow, then higher idle percentages will result in substantially long forced idle periods. In one embodiment, a control is provided where the lower percentage forced idle periods all run at substantially the same rate, as discussed in further detail below. In one embodiment, when the forced idle percentage reaches a threshold where the idle time is at the maximum desired, the idle rate begins to increase so that the maximum idle time is never exceeded, as discussed in further detail below.

Figure 7:
FIG. 7 is a flow chart of one embodiment a method to force a data processing system into an idle state.

FIG. 7 is a flow chart of one embodiment a method 700 to force a data processing system into an idle state. Method begins with operation 701 that involves monitoring a constraint parameter of a data processing system operating at a first frequency and a first voltage. The constraint parameter may be power consumed by the data processing system, temperature of the data processing system, current supplied to the data processing system, load of the battery coupled to supply power to the data processing system, and the like. The constraint parameter may be monitored and measured using one or more sensors, as described above. Method 700 continues with operation 702 that involves forcing the system into an idle state while the system continues to operate at a second frequency and a second voltage, which is different (e.g. lower) than the first voltage, based on the constraint parameter. In one embodiment, forcing the data processing system into the idle state involves preventing instructions from being executed by the system. In one embodiment, time periods when system is in the idle state are interspersed, and/or interleaved with the time periods when the system operates at a higher performance level, such that the average power dissipated by the system does not exceed a maximum average power determined from the system's power and/or thermal constraints. That is, a duty cycling of the forced idle state may be performed at a rate such that users do not need to know what is happening to their machine, as described in further detail below. In one embodiment, the duty cycling of the forced idle state is performed entirely in the frequency domain. The forced idling mechanism extends the power management of the data processing system further beyond the minimum power operating point, such as $P_L$ (301) depicted in FIG. 3A.

Figure 8:
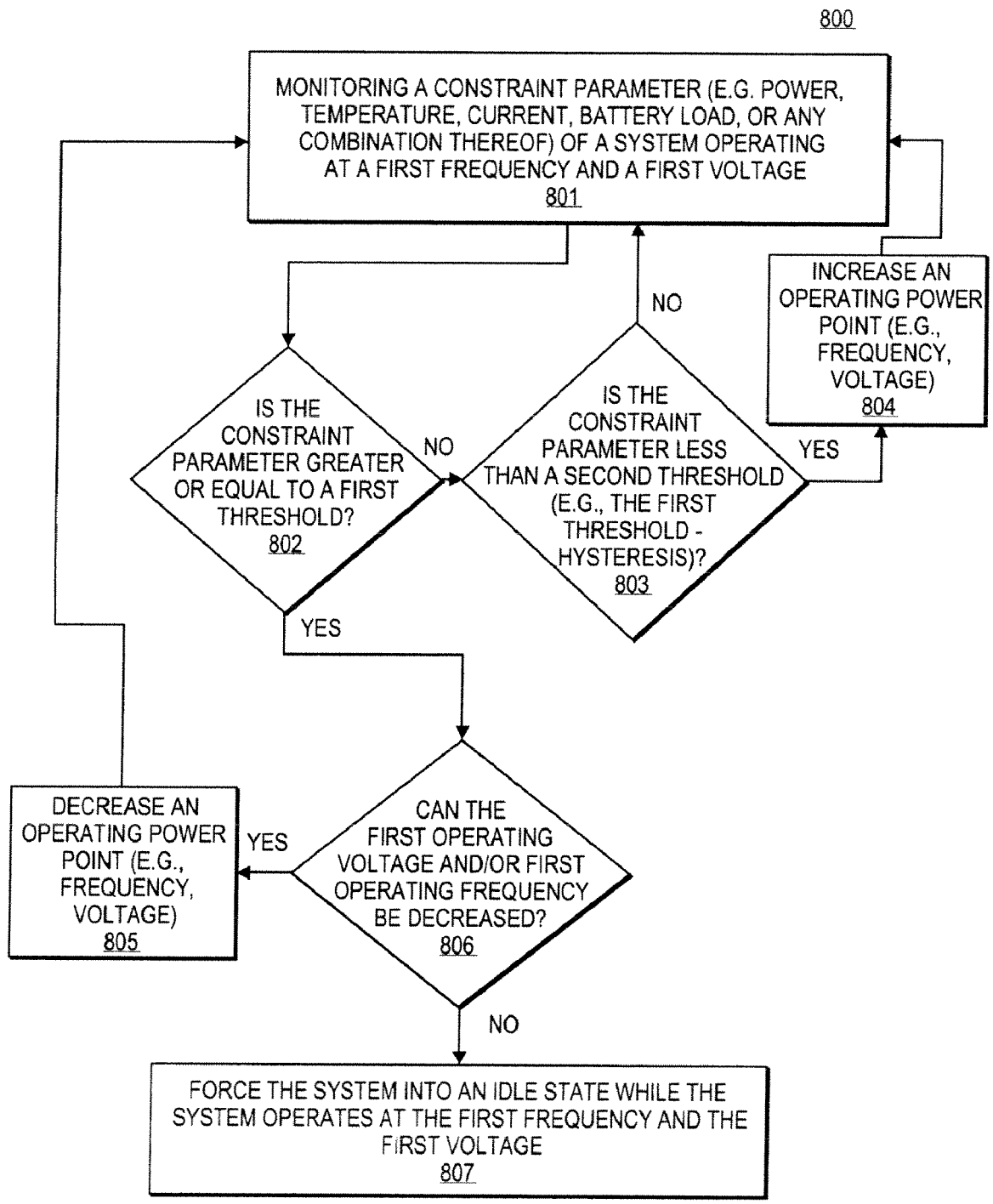
FIG. 8 is a flow chart of one embodiment a method to force a data processing system into an idle state.

FIG. 8 is a flow chart of one embodiment a method 800 to force a data processing system into an idle state. Method begins with operation 801 that involves monitoring a constraint parameter (e.g., an actual power, temperature, current, battery load, the like constraint parameters, or any combination thereof) of a data processing system operating at a first frequency and a first voltage. Method continues with operation 802 that includes determining whether the constraint parameter is greater than a first constraint parameter threshold. A constraint parameter threshold may be associated with a specification power, temperature, battery load, current, of a data processing system. The constraint parameter threshold may be a worst-case value that is valid for a plurality of subsystems of the data processing system, such as subsystems depicted in FIGS. 1B and 2. In one embodiment, the constraint parameter threshold may be, for example, a worst-case power, temperature, current, or battery load value determined from a statistical distribution curve of a number of measured samples. In one embodiment, a measured constraint parameter, such as an actual measured power, temperature, current, battery load, or any combination thereof is compared to the constraint parameter threshold to determine whether the measured constraint parameter is greater or equal to a first constraint parameter threshold. If the constraint parameter is not greater or equal to the first constraint parameter threshold, it is determined at operation 803 whether the constraint parameter is less than a second constraint parameter threshold. The second constraint parameter threshold may be determined by subtracting a hysteresis from the first constraint parameter threshold. If the constraint parameter is less than the second constraint parameter threshold, an operating point (e.g., frequency, voltage) may be increased at operation 804, then method 800 returns to operation 801. If the constraint parameter is not less than the second constraint parameter threshold, method returns to operation 801. If the constraint parameter is greater or equal to the first constraint parameter threshold, at operation 806 it is determined whether the first operating voltage and/or first operating frequency of the data processing system can be further decreased. Next, if it is determined that the first operating voltage and/or first operating frequency can be decreased, the operating power point (e.g., frequency and/or voltage) is decreased at operation 805, then method 800 returns to operation 801. For example, if the first operating voltage corresponds to an intermediate operating voltage, such as $V_N$, and/or the first operating frequency corresponds to an intermediate operating frequency, such as $f_N$, as depicted in FIG. 3A, the operating power point can be moved down by decreasing voltage and/or frequency, for example, to the lowest operating frequency $f_L$ and/or voltage $V_L$. If it is determined that the first operating frequency and/or first operating voltage cannot be decreased, forcing the data processing system into an idle state is performed at operation 807 while continuing the operation of the system at the first operating frequency and the first operating voltage. In one embodiment, whether the first operating voltage is a minimum operating voltage is determined. In one embodiment, the system is forced into the idle state if the first operating voltage is the minimum voltage and the monitored actual constraint parameter is greater than the constraint parameter threshold. In one embodiment, forcing the data processing system into the idle state involves preventing instructions from being executed by the data processing system. In one embodiment, an operating point (e.g., frequency, and/or voltage) of the system is decreased if the system does not operate at the minimum voltage and the monitored actual constraint parameter is greater than the constraint parameter threshold.

In one embodiment, a percentage of the idle state for the system operating at the first frequency and the first voltage is determined based on the constraint parameter. For example, the percentage of the idle state may be decreased or increased based on the constraint parameter.

Figure 9:
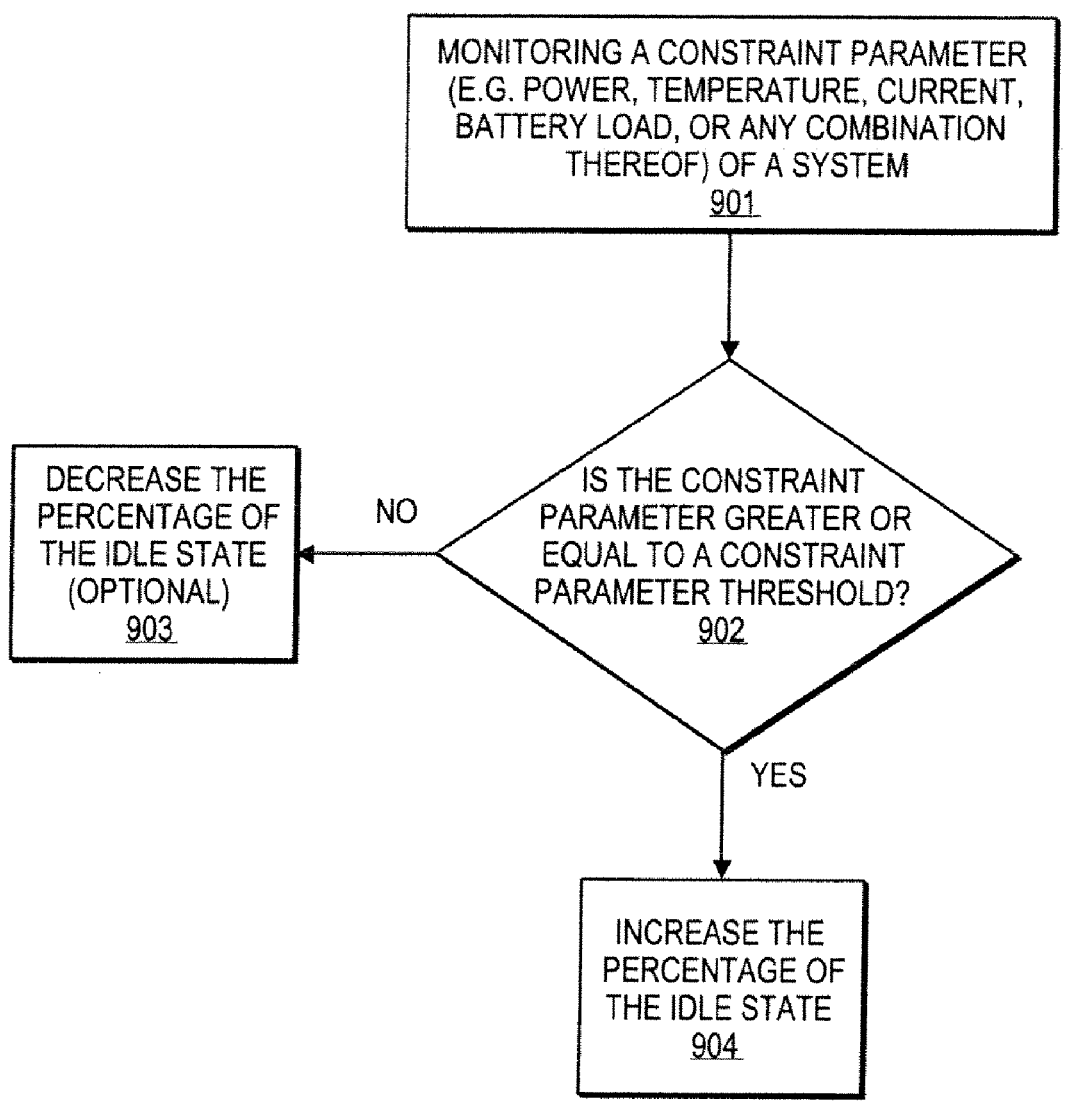
FIG. 9 is a flow chart of one embodiment a method of forcing a data processing system into an idle state based on a constraint parameter.

FIG. 9 is a flow chart of one embodiment a method 900 of forcing a data processing system into an idle state based on a constraint parameter. Method 900 begins with operation 901 that involves monitoring a constraint parameter (e.g., actual used power, actual temperature, current, battery load, or any combination thereof) of a data processing system, as described above. At operation 902 a determination is made whether the constraint parameter is greater or equal to a constraint parameter threshold, as described above. At operation 904, a percentage (portion) of the forced idle state relative the total operating time is increased if it is determined that the constraint parameter is greater or equal to the constraint parameter threshold. If it is determined that the constraint parameter is not greater or equal to the constraint parameter threshold, the percentage of the forced idle state can be optionally increased at operation 903.

Referring back to FIG. 4, the portion of the idle state $T_2$ is increased to $T_2^1$ (405), and the portion of the full operating state $T_1$ is decreased to $T_1^1$ (404) based on the constraint parameter.

FIG. 6 shows one embodiment of a table 600 that includes information about the idle state. As shown in FIG. 6, table 600 includes the following columns: an idle ratio, an idle rate, and an idle time. In one embodiment, lower percentage (e.g., up to 30%) forced idle periods all run at the same rate. When the forced idle percentage reaches a threshold where the time spent in the idle state (idle time) is at the maximum desired, then the idle rate begins to increase so that the maximum idle time is not exceeded. As shown in FIG. 6, when the idle ratio is less or equal to 30, the idle rate may be maintained at a constant value 30000 microseconds, and idle time is increased as idle ratio increases. As shown in FIG. 6, if the idle ratio becomes greater than 30, the idle rate increases, while the idle time may be kept at a constant value of 10000 microseconds.

Figure 12:
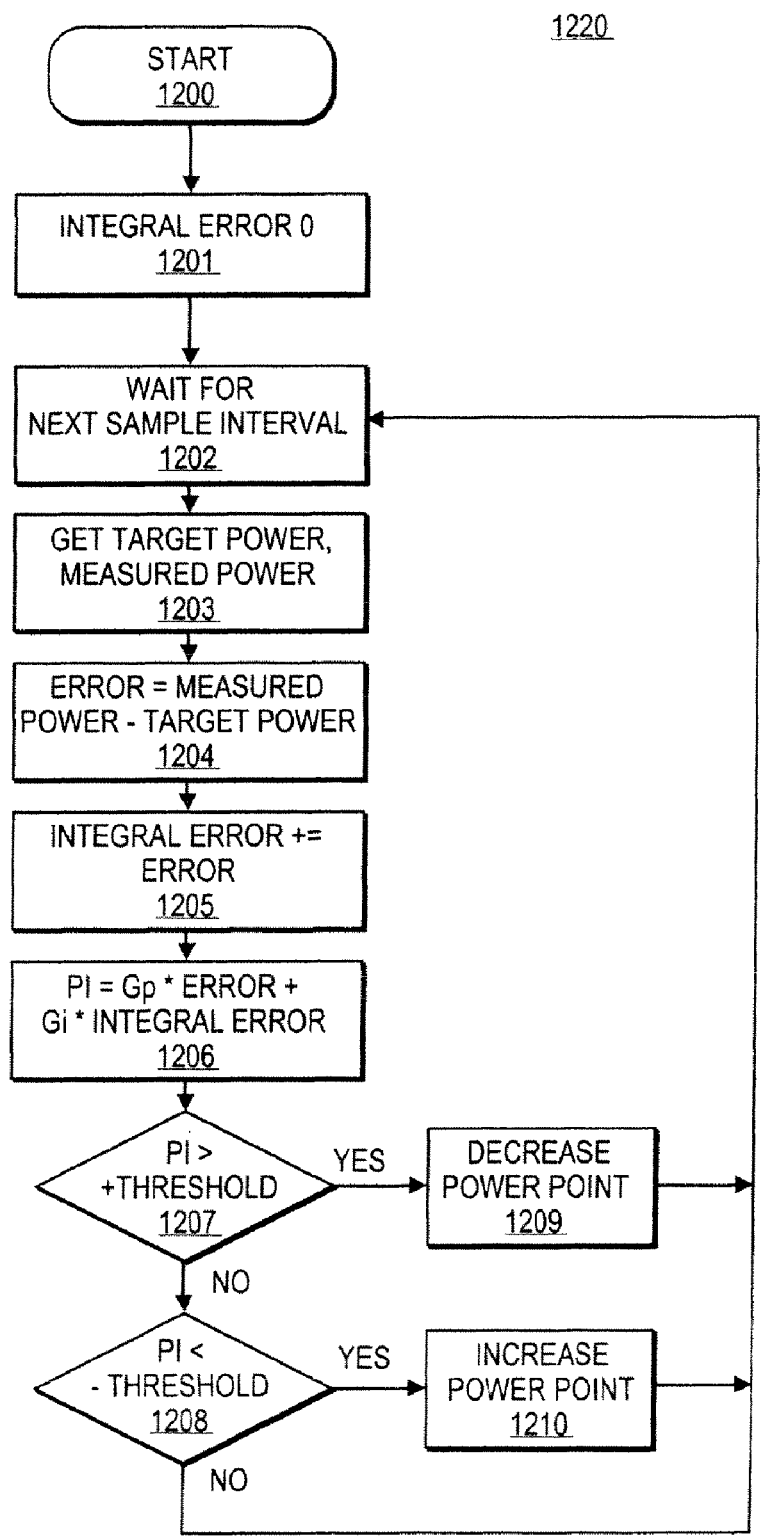
FIG. 12 is a flowchart of one embodiment a method to manage power of a data processing system to a target power.

FIG. 12 is a flowchart of one embodiment a method 1220 to manage power of a data processing system to a target power. Method 1220 starts at 1200. At 1201 an initialization is performed where Integral Error is set to zero ("Integral Error=0"). In one embodiment, the Integral Error is a defined as a difference between a measured power and a target power of the data processing system. At operation 1202 method 1220 waits for a next sample interval to measure the power of the data processing system. At operation 1203 the target power and the measured power of the data processing system are received. In one embodiment, the power is measured during the sample time interval using one or more sensors, as described above. The target power of the data processing system is computed based on one or more system constraint parameters and desired performance of the data processing system, as described above. At operation 1204 a difference ("error") between the power measured during the sample interval and the target power of the data processing system is determined. At operation 1205 an accumulated error ("integral error") is determined. In one embodiment, the integral error accumulated over sample intervals is determined. In one embodiment, the integral error accumulated over one or more clock periods of the data processing system is determined. At operation 1206 an integral power ("PI") over time (e.g., one or more clock periods, and/or sample intervals of the data processing system) is determined. In one embodiment, PI is computed by applying a control system gain "G-term" to the error and the integral error using the following formula:

$$PI=Gp*\text{Error}+Gi\text{ Integral}*\text{Error}, \quad (1)$$

where Gp may be associated with a weighting factor to the error determined over a sample interval, and Gi is associated with a weighting factor to the integral error.

At operation 1207 a determination is made whether the integral power ("PI") is greater than an upper threshold ("+threshold"). If the PI is greater than the upper threshold, operating power point is decreased at operation 1209. If the PI is not greater than the upper threshold, a determination is made at operation 1208 whether the PI is less than a lower threshold. If the PI is less than the lower threshold, operating power point is increased at operation 1210.

Figure 15:
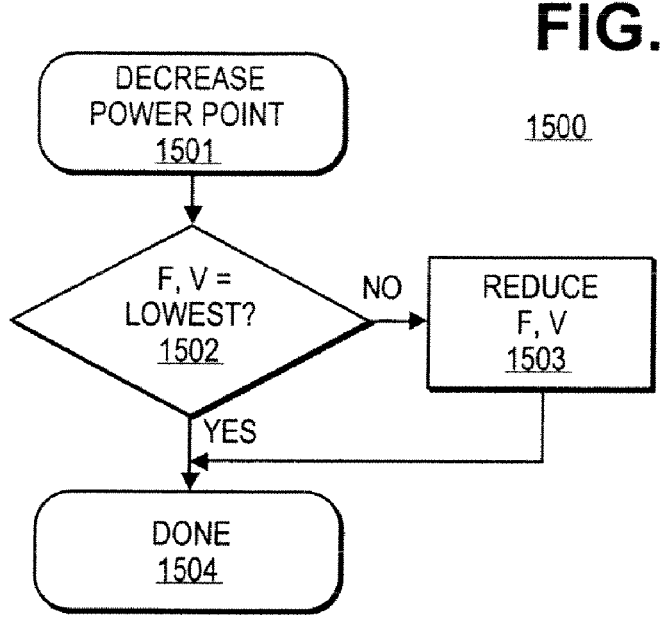
FIG. 15 is a flowchart of one embodiment a method to decrease an operating power point without forced idle.

FIG. 15 is a flowchart of one embodiment a method 1500 to decrease an operating power point without forced idle 1501. At operation 1502 it is determined whether frequency and/or voltage are at a lowest (minimum) level. If the frequency and/or voltage are not at the lowest level, the frequency and/or voltage are decreased at operation 1503. If the frequency and/or voltage are at the lowest level, method 1500 ends at 1504. In many situations, however, this lowest level may not be enough and intelligent forced idling may be used to obtain better performance at this lowest level.

Figure 16:
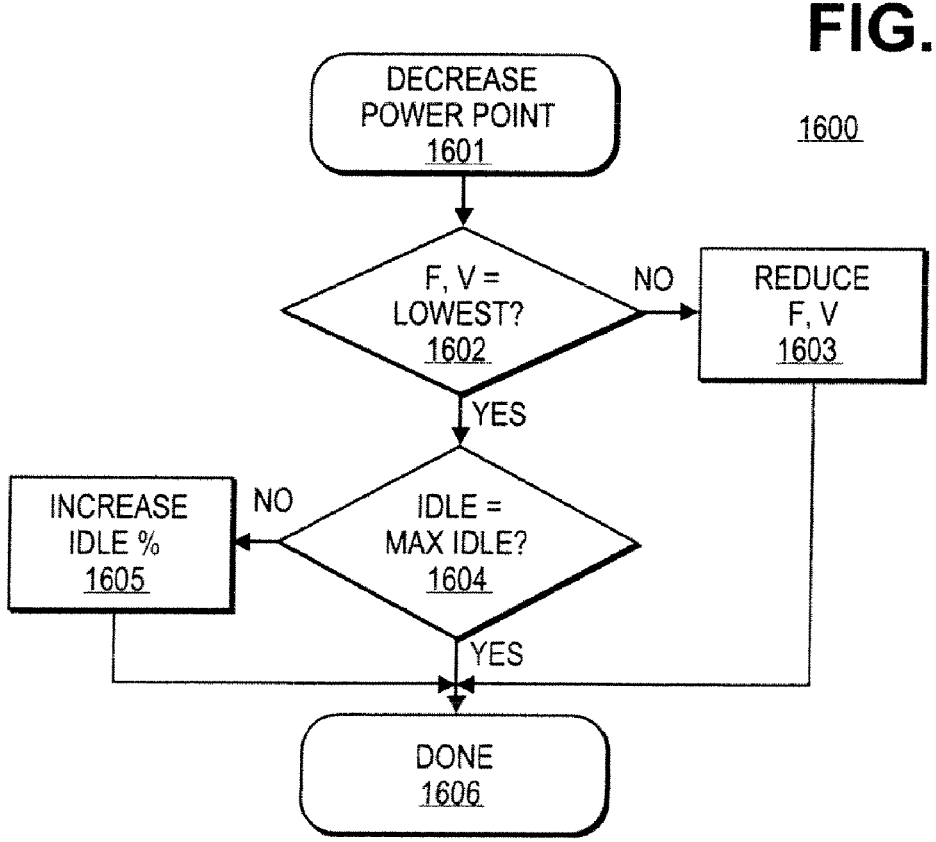
FIG. 16 is a flowchart of one embodiment a method to decrease an operating power point that includes forced idle.

FIG. 16 is a flowchart of one embodiment a method 1600 to decrease an operating power point that includes forced idle 1601. At operation 1602 a determination is made whether frequency and/or voltage at a lowest level. If the frequency and/or voltage are not at the lowest level, the frequency and/or voltage are decreased at operation 1603. If the frequency and/or voltage are at the lowest level, a determination is made at operation 1604 whether a forced idle percentage is at a maximum idle percentage level. If the forced idle percentage is not at the maximum idle percentage level, the forced idle percentage is increased at operation 1605. Method 1600 ends at 1606.

Figure 13:
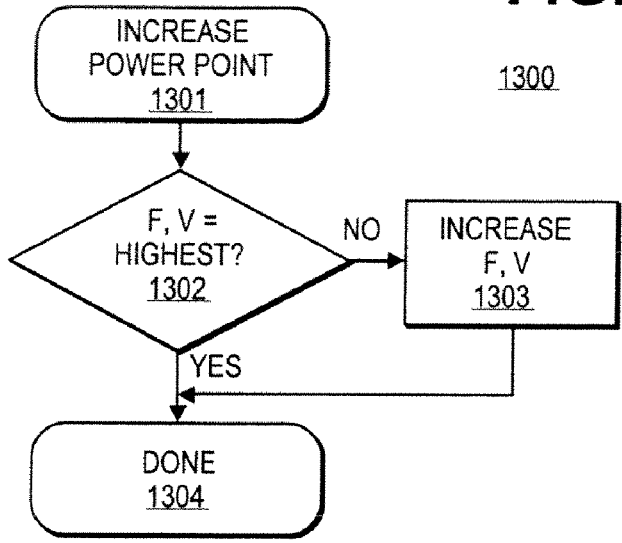
FIG. 13 is a flowchart of one embodiment a method to increase an operating power point without a forced idle.

FIG. 13 is a flowchart of one embodiment a method 1300 to increase an operating power point without forced idle 1301. At operation 1303 a determination is made whether a frequency and/or voltage are at a highest (maximum) level. If the frequency and/or voltage of the data processing system are not at the maximum level, the method continues with operation 1303 that involves increasing the frequency and/or voltage of the data processing system. If the frequency and/or voltage are at the highest level, method 1300 ends.

Figure 14:
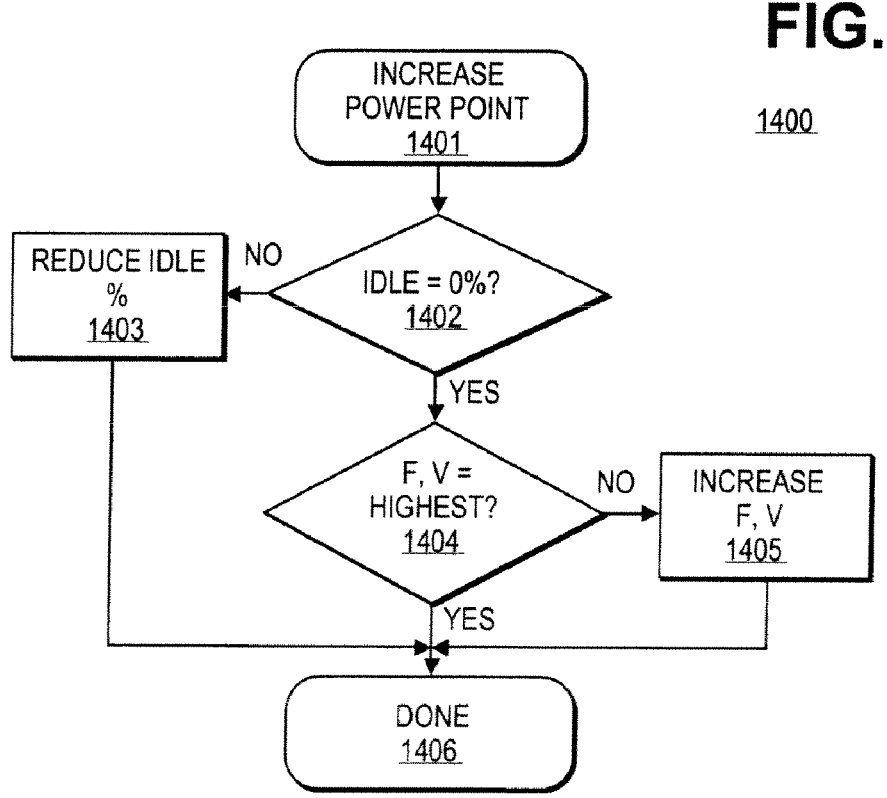
FIG. 14 is a flowchart of one embodiment a method 1400 to increase an operating power point that includes a forced idle.

FIG. 14 is a flowchart of one embodiment a method 1400 to increase an operating power point that includes forced idle 1401. At operation 1402 it is determined whether a forced idle percentage is 0%. If the forced idle percentage is not 0%, the forced idle percentage is reduced at operation 1403. If the forced idle percentage is 0%, the determination is made at operation 1404 whether a frequency and/or voltage are at a highest level. If the frequency and/or voltage are not at the highest level, frequency and/or voltage are increased at operation 1405. The method ends at 1406.

Figure 17:
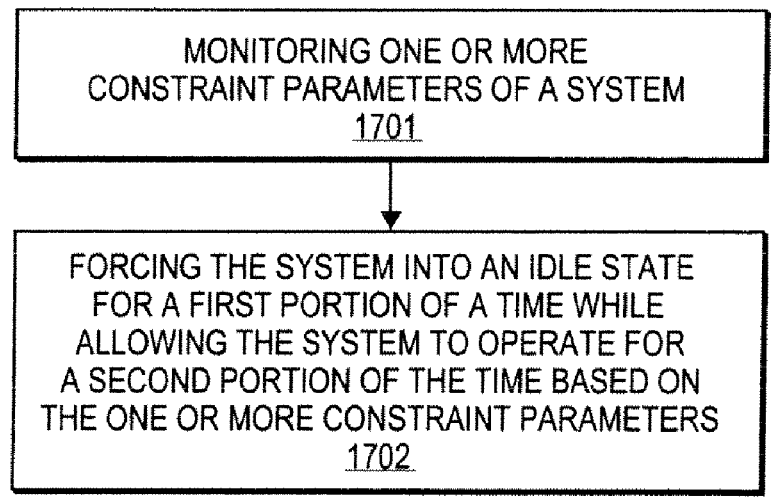
FIG. 17 is a flow chart of one embodiment a method to provide a forced idle state for a data processing system.

FIG. 17 is a flow chart of one embodiment a method 1700 to provide forced idle state for a data processing system. As shown in FIG. 17, method 1700 begins with operation 1701 that includes monitoring one or more constraint parameters of the data processing system, as described above. Method continues with operation 1702 that involves forcing the data processing system into an idle state for a first portion of a time while allowing the system to operate for a second portion of the time based on the one or more constraint parameters. This forcing is in response to a comparison between a target idle time and an actual idle time.

FIG. 18 is a flow chart of one embodiment a method 1800 to switch from a forced idle state. Method 1800 begins with operation 1801 that involves determining a target forced idle time based on one or more constraint parameters of a data processing system. For example the target forced idle time may be determined by multiplying an operating period (e.g., a clock period of the data processing system) to an idle ratio. In one embodiment, the idle ratio is associated with a portion of the idle time relative to the total operating time, as described above. In one embodiment, the idle ratio is determined based on system power/thermal constraints and the system performance. Method continues with operation 1802 that involves monitoring an actual time the data processing system spent in the idle state ("actual idle time"). In one embodiment, the actual idle time is measured by one or more sensors and stored in a memory of the system to provide an accumulated idle time over one or more clock periods of the system. 4. In one embodiment, the accumulated idle time is determined over one or more clock periods of the system.

At operation 1803 an accumulated idle time is determined based on the actual idle time. At operation 1804 a determination is made whether the accumulated idle time is greater or equal to the target idle time. If the accumulated idle time is greater or equal the target idle time, the system is allowed to switch from the idle state to a full operating state for a portion of the time at operation 1805 based on the target idle time and the accumulated idle time. In one embodiment, the system is switched from the idle state to continue an operation for a portion of the operating time. In one embodiment, the idle state prevents the data processing system from executing software instructions which are waiting to be executed. In one embodiment, a memory of the data processing system stores one or more look up tables that include the target idle time associated with the one or more constraint parameters.

FIG. 19 is a flow chart of one embodiment a method 1900 to provide a forced idle state. Method 1900 begins at 1901 that includes starting a forced idle state. At operation 1902 it is determined whether a ratio between the time during which the data processing system is allowed to run to the forced idle time ("operating ratio") is less than 100. If the operating ratio is less than 100, the idle percentage (portion) is determined at operation 1903 using the following formula:

$$\text{max\_idle} = ((100 - \text{operating ratio}) * \text{Period})/100, \quad (2)$$

where Period represents a clock period of the system $T=1/f$, where f is the frequency of the system.

Next, a determination is made at operation 1905 whether the idle percentage is greater than a last idle ("last_idle"). In one embodiment, the last idle is determined from a previous time, e.g., a clock period of the system. If the max_idle is greater than the last_idle, an accumulated idle is computed at operation 1907 by taking into account the last idle according to the following:

$$\text{max\_idle} = \text{max\_idle} - \text{last\_idle} \quad (3)$$

If the max_idle is not greater than last_idle, max_idle is set to 0 at operation 1906. Then method 1900 continues at operation 1908 that involves determining an end of a period to allow the data processing system to operate according to the following:

$$\text{period\_end} = \text{now} + \text{Period}, \quad (4)$$

where "now" is a current time, and "Period" is a clock period.

Next, at operation 1909 target idle time is determined ("idle_goal") at operation 1909 according to the following:

$$\text{idle\_goal} = \text{accumulated\_idle} + \text{maximum idle}, \quad (5)$$

where "accumulated_idle" is the total amount of idle time accumulated from one or more previous times (e.g., clock periods), and "maximum idle" is the most recent idle time.

Further, at operation 1910 it is determined whether the accumulated idle is less than idle_goal. If the accumulated idle is less than idle_goal, only high priority threads are allowed to run at operation 1914. The data processing system (e.g., a CPU) is forced to the idle state for up to max_idle time at operation 1915. In one embodiment, interrpts cause the system to exit from the idle state. The accumulated idle is updated for the amount of time the data processing system is spending in the forced idle state taking into account the interrupts. Then method 1900 returns to operation 1910. If the accumulated idle is not less than the idle_goal, the idle start time is set to be the accumulated_idle at operation 1911. Method 1900 continues with operation 1912 that includes allowing any thread to run until period_end determined at operation 1908. At operation 1913 last_idle is determined according to the following formula:

$$last\_idle = accumulated\_idle - idle\_start \qquad (6)$$

Then method 1900 returns to operation 1902.

Figure 10:
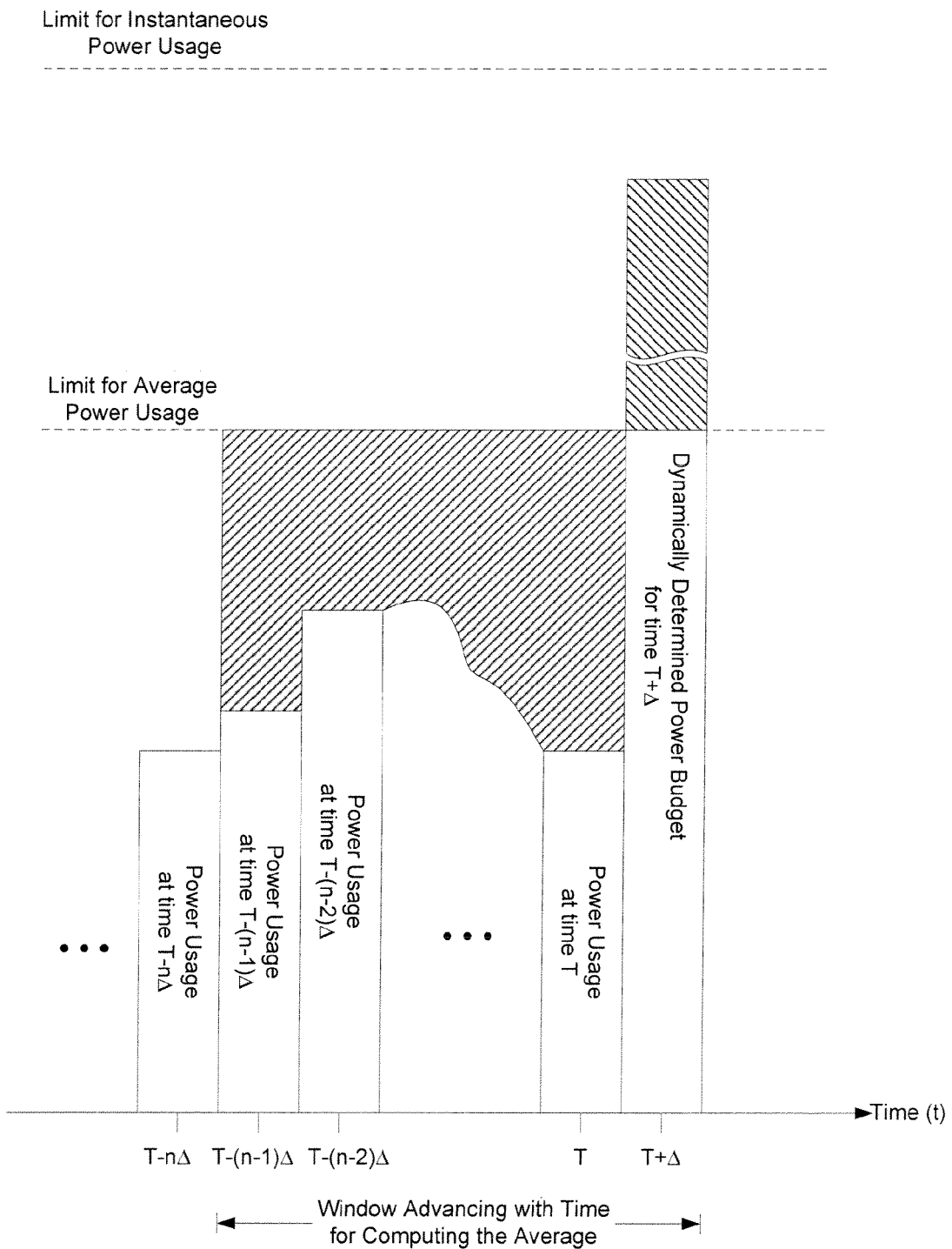
FIG. 10 illustrates a method to dynamically determine a power usage budget which may be used with certain embodiments described herein.
Figure 11:
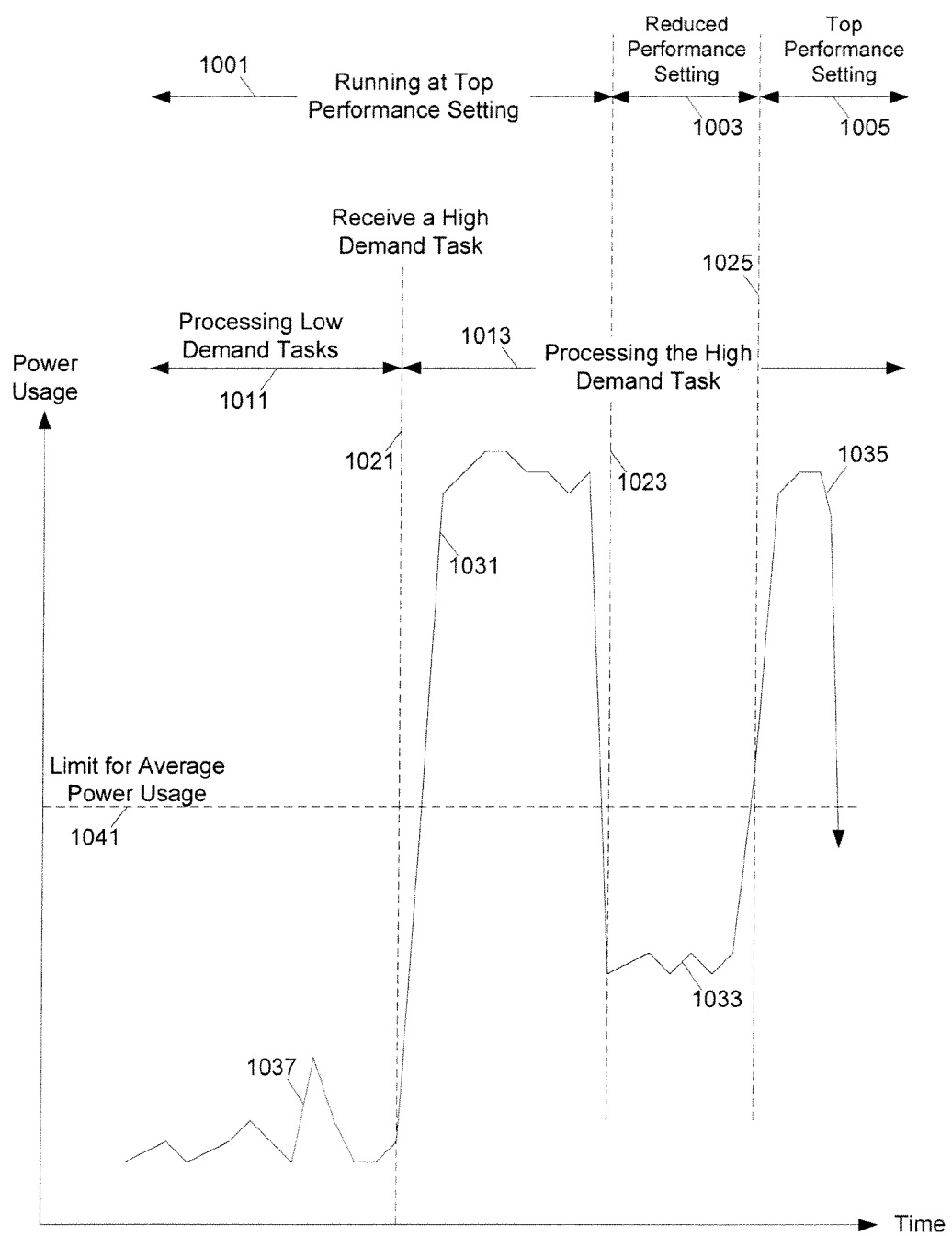
FIG. 11 shows a scenario of power usage which may be used with certain embodiments described herein.

The intelligent forced idling shown in FIGS. 18 and 19 may be performed in combination with one or more of the power and/or thermal management techniques described in U.S. application Ser. No. 11/212,970, filed Aug. 25, 2005, and/or U.S. application Ser. No. 11/327,685, filed Jan. 5, 2006. For example, intelligent forced idling may be employed with averaging of power usage to allow for dynamic determination of an allowable power budget for a future time interval; FIGS. 10 and 11 are from U.S. application Ser. No. 11/212,970 and relate to embodiments which utilize averaging of power usage, and these embodiments and figures are described further in that application.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A machine-implemented method, comprising:
   monitoring a constraint parameter of a system operating at a first frequency and a first voltage, the first voltage applied to a voltage input of the system from a power supply;
   forcing the system into an idle state in which instructions are prevented from being executed by at least decreasing, at the voltage input, the first voltage to a voltage below a second voltage based on the monitoring of the constraint parameter.

2. The machine-implemented method of claim 1 wherein the system is forced into the idle state while the system continues to operate at a second frequency that is less than the first frequency.

3. The machine-implemented method of claim 1, further comprising:
   determining a rate of forcing the system into the idle state.

4. The machine-implemented method of claim 1, wherein the second voltage is a minimum voltage, the method further comprising:
   determining whether the constraint parameter is greater than a constraint parameter threshold;
   determining whether the first voltage is decreased to the second voltage; and
   forcing the system into the idle state if the first voltage is decreased to the second voltage and the constraint parameter is greater than the constraint parameter threshold.

5. The machine-implemented method of claim 4, further comprising:
   decreasing an operating point of the system if the system does not operate at the minimum voltage and the constraint parameter is greater than the constraint parameter threshold.

6. The machine-implemented method of claim 1, wherein the constraint parameter is a power, a temperature, a current, a battery load, or any combination thereof and wherein the system continues to operate at a second frequency that is greater than zero and is less than the first frequency and wherein the second voltage is greater than zero and is less than the first voltage.

7. The machine-implemented method of claim 1, further comprising:
   determining a percentage of the idle state for the system operating at the first frequency and the first voltage based on the constraint parameter and wherein the first frequency is decreased to zero the first voltage is decreased to zero for at least a portion of the system.

8. A data processing system, comprising:
   a processor,
   a memory, coupled to the processor;
   one or more sensors coupled to the processor to monitor a constraint parameter of a system operating at a first frequency and a first voltage, the first voltage applied to a voltage input of the system from a power supply wherein the processor is configured to force the system into an idle state in which instructions are prevented from being executed by at least decreasing, at the voltage input, the first voltage to a voltage below an operating voltage based on monitoring of the constraint parameter.

9. The data processing system of claim 8, wherein the system is forced into the idle state while the system continues to operate at a second frequency that is less than the first frequency.

10. The data processing system of claim 8, wherein the processor is further configured to
    determine a rate of forcing the system into the idle state.

11. The data processing system of claim 8, wherein the second voltage is a minimum voltage and wherein the processor is further configured to
    determine whether the constraint parameter is greater than a constraint parameter threshold, determine whether the first voltage is decreased to the second voltage, and force the system into the idle state if the first voltage is decreased to the second voltage and the constraint parameter is greater than the constraint parameter threshold.

12. The data processing system of claim 11, wherein the processor is further configured to
    decrease an operating point of the system if the system does not operate at the minimum voltage and the constraint parameter is greater than the constraint parameter threshold.

13. The data processing system of claim 8, wherein the processor is further configured to
    determine a percentage of the idle state for the system operating at the first frequency and the first voltage based on the constraint parameter and wherein the first frequency is decreased to zero and the first voltage is decreased to zero for at least a portion of the processor.

14. The data processing system of claim 8, wherein the memory stores information about when and how to force the system into the idle state.

15. The data processing system of claim 8, wherein the constraint parameter is a power, a temperature, a current, a battery load, or any combination thereof and wherein the second frequency is greater than zero and is less than the first frequency and wherein the second voltage is greater than zero and is less than the first voltage.

16. A machine-readable storage medium storing executable program instructions which cause a data processing system to perform operations comprising:

monitoring a constraint parameter of the system operating at a first frequency and a first voltage, the first voltage applied to a voltage input of the system from a power supply;

forcing the system into an idle state in which instructions are prevented from being executed by at least decreasing, at the voltage input, the first voltage to a voltage below an operating voltage based on the monitoring of the constraint parameter.

17. The machine-readable medium of claim 16, wherein the system is forced into the idle state while the system continues to operate at a second frequency that is less than the first frequency.

18. The machine-readable medium of claim 16, further including instructions that cause the data processing system to perform operations comprising:

determining a rate of forcing the system into the idle state.

19. The machine-readable medium of claim 16, wherein the second voltage is a minimum voltage and wherein the machine-readable medium further including instructions that cause the data processing system to perform operations comprising:

determining whether the constraint parameter is greater than a constraint parameter threshold; determining whether the first voltage is decreased to the minimum voltage; and forcing the system into the idle state if the first voltage is decreased to the second voltage and the constraint parameter is greater than the constraint parameter threshold.

20. The machine-readable medium of claim 19, further including instructions that cause the data processing system to perform operations comprising:

decreasing an operating point of the system if the system does not operate at the minimum voltage and the constraint parameter is greater than the constraint parameter threshold.

21. The machine-readable medium of claim 16, further including instructions that cause the data processing system to perform operations comprising:

determining a percentage of the idle state for the system operating at the first frequency and the first voltage based on the constraint parameter and wherein the first frequency is decreased to zero and the first voltage is decreased to zero for at least a portion of the system.

22. The machine-readable medium of claim 16, wherein the constraint parameter is a power, a temperature, a current, a battery load, or any combination thereof and wherein the second frequency is greater than zero and is less than the first frequency and wherein the second voltage is greater than zero and is less than the first voltage.

23. A data processing system, comprising:

means for monitoring a constraint parameter of the system operating at a first frequency and a first voltage, the first voltage applied to a voltage input of the system from a power supply;

means for forcing the system into an idle state in which instructions are prevented from being executed by at least decreasing, at the voltage input, the first voltage to a voltage below a second voltage based on the monitoring of the constraint parameter.

24. The data processing system of claim 23, wherein the second voltage is a minimum voltage, the data processing system further comprising:

means for determining whether the constraint parameter is greater than a constraint parameter threshold;

means for determining whether the first voltage is decreased to the second voltage; and means for forcing the system into the idle state if the first voltage is decreased to the second voltage and the constraint parameter is greater than the constraint parameter threshold.

25. The data processing system of claim 23, further comprising:

means for determining a percentage of the idle state for the system operating at the first frequency and the first voltage based on the constraint parameter, and wherein the second frequency is greater than zero and is less than the first frequency and wherein the second voltage is greater than zero and is less than the first voltage.

\* \* \* \* \*

UNITED STATES PATENT AND TRADEMARK OFFICE
CERTIFICATE OF CORRECTION

| | | |
|---|---|---|
| PATENT NO. | : 7,949,888 B2 | Page 1 of 1 |
| APPLICATION NO. | : 11/970476 | |
| DATED | : May 24, 2011 | |
| INVENTOR(S) | : Keith Cox et al. | |

It is certified that error appears in the above-identified patent and that said Letters Patent is hereby corrected as shown below:

In Sheet 3 of 18, figure 2, in Box 205, line 3, delete "MICROPROESSOR," and insert -- MICROPROCESSOR, --, therefor.

In column 8, line 29, delete "5." and insert -- 5, --, therefor.

In column 16, line 63, delete "interrpts" and insert -- interrupts --, therefor.

In column 18, line 9, in Claim 7, delete "the" and insert -- and the --, therefor.

Signed and Sealed this
Twenty-ninth Day of November, 2011

David J. Kappos
*Director of the United States Patent and Trademark Office*